United States Patent
Mullet et al.

(10) Patent No.: US 9,609,114 B2
(45) Date of Patent: Mar. 28, 2017

(54) SYSTEM AND METHOD FOR WIRELESS COMMUNICATION WITH AND CONTROL OF MOTORIZED WINDOW COVERINGS

(71) Applicant: QMOTION INCORPORATED, Pensacola, FL (US)

(72) Inventors: Willis Jay Mullet, Gulf Breeze, FL (US); Matthew Warren Kirkland, Cantonment, FL (US)

(73) Assignee: The Watt Stopper, Inc., Santa Clara, CA (US)

( * ) Notice: Subject to any disclaimer, the term of this patent is extended or adjusted under 35 U.S.C. 154(b) by 0 days.

(21) Appl. No.: 14/781,198

(22) PCT Filed: Mar. 26, 2014

(86) PCT No.: PCT/US2014/031849
§ 371 (c)(1),
(2) Date: Sep. 29, 2015

(87) PCT Pub. No.: WO2014/165367
PCT Pub. Date: Oct. 9, 2014

(65) Prior Publication Data
US 2016/0127530 A1    May 5, 2016

Related U.S. Application Data

(60) Provisional application No. 61/807,804, filed on Apr. 3, 2013.

(51) Int. Cl.
*H04B 1/38* (2015.01)
*H04M 1/725* (2006.01)
(Continued)

(52) U.S. Cl.
CPC .......... *H04M 1/72533* (2013.01); *E06B 9/68* (2013.01); *G06F 3/0481* (2013.01);
(Continued)

(58) Field of Classification Search
CPC ...... E06B 9/72; E06B 9/42; E06B 2009/6809; E06B 9/68; E06B 9/40; E06B 9/32; E06B 2009/3222; H04W 4/001
(Continued)

(56) References Cited

U.S. PATENT DOCUMENTS 9,015,613 B2 * 4/2015 Duchene .............. G05B 19/042
715/771
2006/0185799 A1 * 8/2006 Kates ....................... E06B 9/32
160/5
(Continued)

*Primary Examiner* — Keith Ferguson
(74) *Attorney, Agent, or Firm* — Christopher A. Proskey; BrownWinick Law Firm

(57) ABSTRACT

A system for controlling at least one motorized window covering using wireless communication is presented. The system includes a wireless device which is wirelessly connected to wireless access point which is connected to a gateway which is wirelessly connected to at least one motorized window covering. The wireless device has a display and an application installed thereon. The application includes an interactive illustration of a window with a moveable bottom bar that extends there across and a plurality of actuation buttons. When a user actuates either the moveable bottom bar or any one of the actuation buttons, the wireless device transmits a control signal to any wirelessly connected motorized window covering instructing it to move in a directed manner. This system provides a convenient and easy to use system and method of controlling motorized window shades.

13 Claims, 23 Drawing Sheets

(51) Int. Cl.
*G06F 3/0484* (2013.01)
*E06B 9/68* (2006.01)
*G06F 3/0481* (2013.01)
*H04W 4/00* (2009.01)

(52) U.S. Cl.
CPC ........ *G06F 3/04847* (2013.01); *H04W 4/001* (2013.01); *E06B 2009/6809* (2013.01)

(58) Field of Classification Search
USPC .................. 455/454, 575.1, 445, 422.1, 403, 455/418–420, 426.1, 426.2, 466, 310, 455/500, 517; 370/310, 328, 329, 338, 370/343
See application file for complete search history.

(56) References Cited

U.S. PATENT DOCUMENTS

| | | | |
|---|---|---|---|
| 2012/0031571 A1* | 2/2012 | Mullet | E06B 9/40 160/310 |
| 2012/0193035 A1* | 8/2012 | Malekpour | E06B 9/36 160/5 |
| 2013/0127603 A1* | 5/2013 | Choo | E05D 15/0626 340/12.5 |
| 2014/0265863 A1* | 9/2014 | Gajurel | H05B 37/02 315/131 |
| 2014/0277749 A1* | 9/2014 | Choo | E06B 9/72 700/275 |

\* cited by examiner

SYSTEM AND METHOD FOR WIRELESS COMMUNICATION WITH AND CONTROL OF MOTORIZED WINDOW COVERINGS

FIELD OF THE INVENTION

This invention relates to motorized window coverings. More specifically, and without limitation, this invention relates to a system and method for wireless communication with and control of motorized window coverings.

BACKGROUND OF INVENTION

Since the mass adoption of increasingly powerful wireless and handheld devices countless applications have been developed to perform an endless array of functions. Many of these applications involve wireless actuation and control of various mechanized or motorized devices. As one example, applications exist which enable a user to start their vehicle using their wirelessly enabled hand held device. As another example, applications exist which enable a user to turn the lights on or off at their home. As yet another example, applications exist which enable a user to turn on the air conditioning or furnace at their home and/or change the temperature at their home.

Motorized window coverings are old and well known in the art, as is the electronic control of motorized window coverings. Despite the improvements in prior art electronic devices used to control motorized window coverings, deficiencies and problems remain. In particular, prior applications lacked features that allowed a user to accurately and precisely actuate one or more motorized window coverings. Prior applications also lack a simple design that provides a plurality of ways to actuate one or more motorized window coverings. Prior art applications also lack user-interactive features that provide visual feedback regarding the position of the actuated window coverings. These and other problems regarding the prior art control of motorized window coverings have not been addressed.

Thus it is a primary object of the invention to provide a system and method for wireless communication with and control of motorized window coverings that improves upon the state of the art.

Another object of the invention is to provide a system and method for wireless communication with and control of motorized window coverings that is easy to use.

Yet another object of the invention is to provide a system and method for wireless communication with and control of motorized window coverings that is intuitive.

Another object of the invention is to provide a system and method for wireless communication with and control of motorized window coverings that is simple.

Yet another object of the invention is to provide a system and method for wireless communication with and control of motorized window coverings that provides a plurality of ways to actuate the motorized window coverings.

Another object of the invention is to provide a system and method for wireless communication with and control of motorized window coverings that is inexpensive.

Yet another object of the invention is to provide a system and method for wireless communication with and control of motorized window coverings that allows for the actuation of a plurality of window coverings simultaneously.

Another object of the invention is to provide a system and method for wireless communication with and control of motorized window coverings that allows for wirelessly grouping of a plurality of motorized window coverings.

Yet another object of the invention is to provide a system and method for wireless communication with and control of motorized window coverings that provides visual feedback.

These and other objects, features, or advantages of the present invention will become apparent from the specification and claims.

SUMMARY OF THE INVENTION

A system for controlling at least one motorized window covering using wireless communication is presented. The system includes a wireless device which is wirelessly connected to wireless access point which is connected to a gateway which is wirelessly connected to at least one motorized window covering. The wireless device has a display and an application installed thereon. The application includes an interactive illustration of a window with a moveable bottom bar that extends there across and a plurality of actuation buttons. When a user actuates either the moveable bottom bar or any one of the actuation buttons, the wireless device transmits a control signal to any wirelessly connected motorized window covering instructing it to move in a directed manner. This system provides a convenient and easy to use system and method of controlling motorized window shades.

BRIEF DESCRIPTION OF THE DRAWINGS

FIG. 6 is a plan view of a screen of an application used with the system, the view showing the selection of groups or scenes and a plurality of groups to select from.

DETAILED DESCRIPTION OF THE INVENTION

Figure 1:
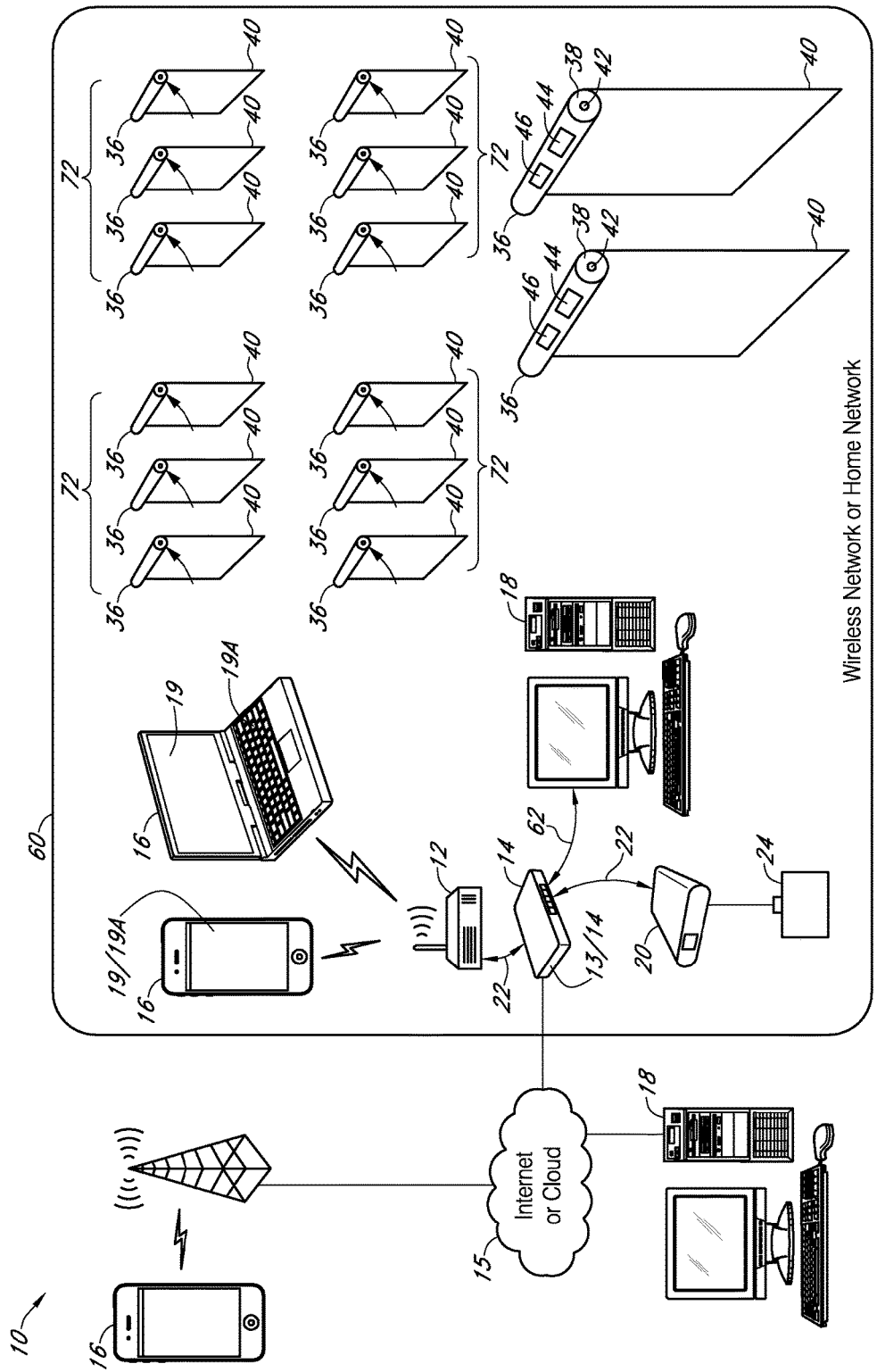
FIG. 1 is a plan view of a system for wireless communication with and control of a plurality of motorized window coverings.
Figure 2:
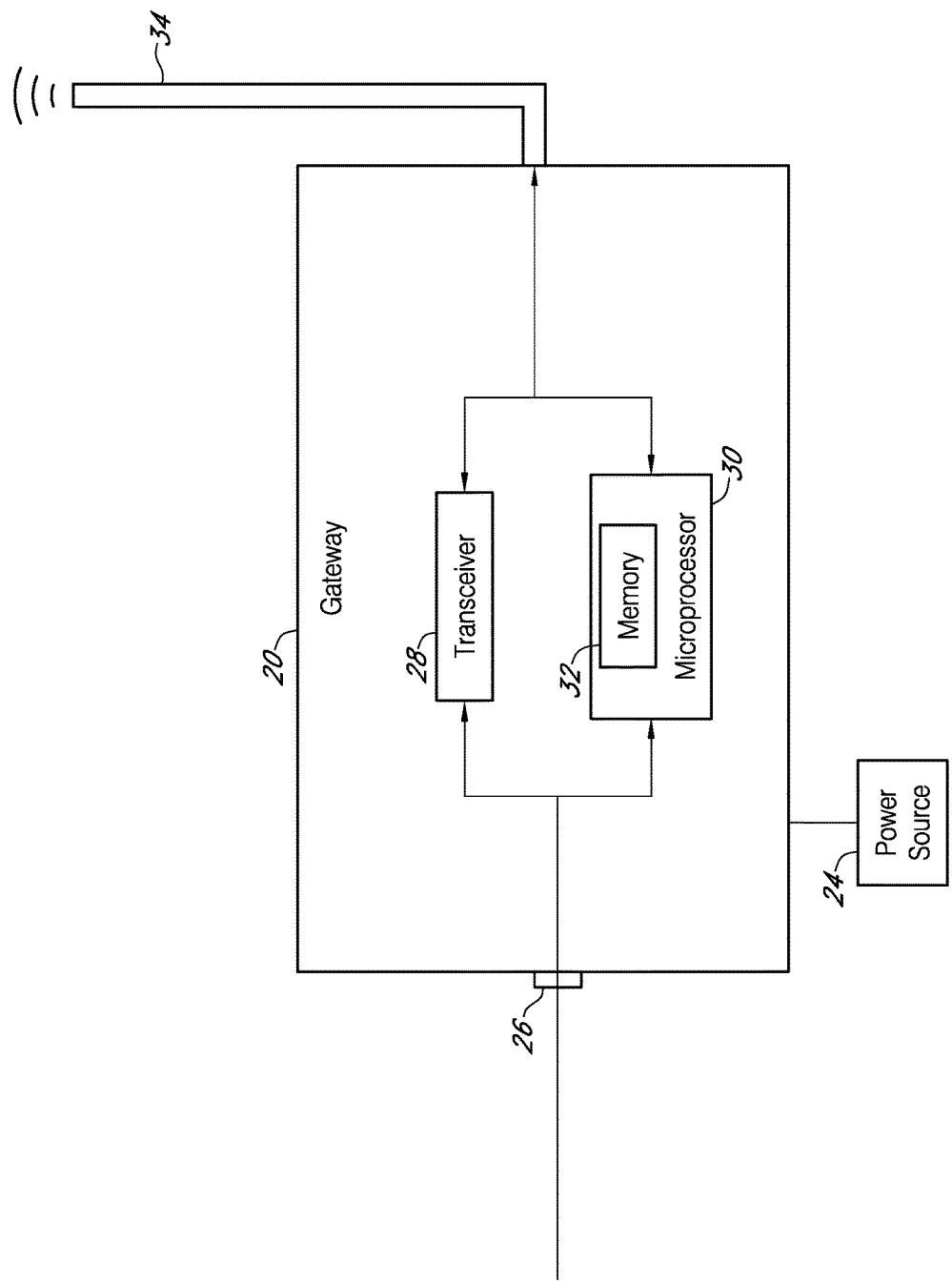
FIG. 2 is a plan view of a gateway associated with the system for wireless communication with and control of motorized window coverings.
Figure 3:
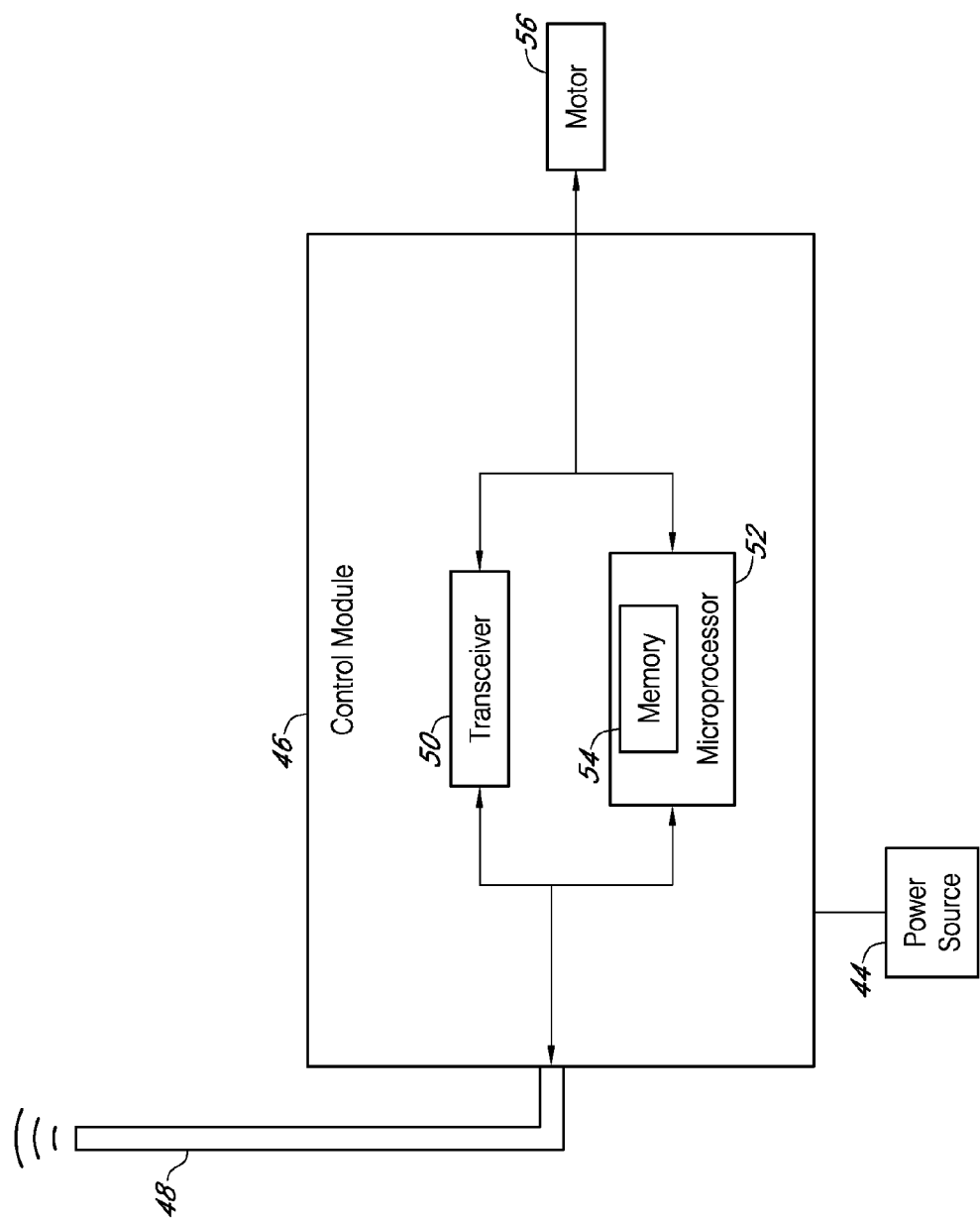
FIG. 3 is a plan view of a control module of a wireless motorized and battery powered window covering associated with the system for wireless communication with and control of motorized window coverings.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

As used herein, the invention is shown and described as being used in association with a plurality of window coverings. However, the invention is not so limiting and can be used in association with any wirelessly controllable mechanized device such as doors, windows, dividers, barriers, or the like. Also, while the term window coverings is used consistently throughout, this term too is not meant to be limiting and instead refers to any window covering such as a blind, shade, drapery or the like.

With reference to the Figures, a system 10 system and method for wireless communication with and control of motorized window coverings is presented. The system 10 includes a wireless access point 12 which is electronically connected to a modem 13 and/or a router 14 on one end and electronically connected to an electronic network such as the internet or cloud 15 on another end. In one arrangement, modem 13 and router 14 are a single device and therefore reference to router 14 herein shall include reference to modem 13. Wireless access point 12 is any device that allows wireless devices to connect to a wired network using Wi-Fi, or any other form of over-the-air electronic communication. Router 14 is any device that forwards data packets between computers and/or computer networks. A router is connected to two or more data lines from different computers and/or networks. When a data packet comes in one of the lines, the router reads the address information in the packet to determine its ultimate destination. Then, using information in its routing table or routing policy, it directs the packet to the next computer and/or network on its journey. A router performs the "traffic directing" functions between computers on a network. In one arrangement, wireless access point 12 and router 14 are separated stand-alone devices. In another arrangement, wireless access point 12 and router 14 are combined into a single unit. Hereinafter, the terminology wireless access point 12 will be used with the understanding that in one arrangement router 14 is not necessary and only a wireless access point 12 is utilized, whereas in other arrangements a router 14 and wireless access point 12 are used, as individual or combined units.

A wireless device 16 is electronically connected to wireless access point 12. Wireless device 16 is any electronic device which sends and/or receives signals using Wi-Fi, or any other form of over-the-air electronic communication. In one arrangement, as is depicted, wireless device 16 includes a smart phone 16A and a wirelessly enabled computer or laptop 16B, however any other wireless device is hereby contemplated such as a tablet, a remote, a wireless switch, or the like. Wireless device 16 sends and/or receives information and control signals to wireless access point 12. Any number of wireless devices 16 are hereby contemplated for use in association with the system 10 without limit.

In one arrangement, a wired device 18 is also electronically connected to wireless access point 12. Wired device 18 is any electronic device which sends and/or receives signals through wired communication. In one arrangement, a desktop computer, or laptop computer is connected to wireless access point via a cable, such as an Ethernet cable or Ethernet physical layer, however any other form of connection is hereby contemplated. Wired device 18 sends and/or receives information and control signals to wireless access point 12. Any number of wired devices 18 are hereby contemplated for use with the system 10 without limit.

In one arrangement, wireless device(s) 16 and wired device(s) 18 have a display device 19. Display device 19 is any output device for presentation of information in visual or tactile form. In one arrangement, display device 19 is an electronic visual display which presents electronic images to the user. In one arrangement, wireless device(s) 16 and wired device(s) 18 also include a control 19A. Control 19A is any device which a user actuates to manipulate wireless device 16/wired device 18, such as a plurality of buttons, a keyboard, a voice recognition module, or the like. In one arrangement, wireless device 16 and/or wired device 18 include a touch screen display which serves as both display 19 and control 19A, or serves in addition to a control 19A (as an example in the event that the device 16/18 has both a touch screen as well as a keyboard) as well as display 19.

Gateway 20 is electronically connected to wireless access point 12 via cable 22. In one arrangement, cable 22 is a conventional Ethernet cable, or Ethernet physical layer, however any other form of connection is hereby contemplated. Gateway 20 is electronically connected to power source 24. Power source 24 is any form of electric power. In one arrangement, power source 24 is a conventional AC wall outlet, however any other form of electric power is hereby contemplated such as a battery system, a generator or the like. In one arrangement, the AC Power is converted to DC Power for consumption by Gateway 20.

Gateway 20 is connected to wireless access point 12 at input 26. Gateway 20 receives control signals from wireless device 16 or wired device 18 through input 26. In one arrangement, gateway 20 only supports one way communication. That is in this arrangement, gateway 20 merely possess the ability to send signals to the plurality of motorized window coverings, while lacking the ability to receive signals from the plurality of motorized window coverings. In this arrangement, gateway 20 includes a transmitter which only supports one way communication.

In another arrangement, gateway 20 supports two-way communication. That is in this arrangement, gateway 20 possess the ability to send signals to the plurality of motorized window coverings, as well as possessing the ability to receive signals from the plurality of motorized window coverings. In this arrangement, gateway 20 includes a transceiver which supports two-way communication.

The following description is directed towards two-way communication, with the understanding that one-way communication is hereby contemplated and supported by this disclosure by eliminating the two-way connection features.

Gateway 20 includes a transceiver 28 and a microprocessor 30. Transceiver 28 is any device which transmits and receives an electronic signal. In one arrangement, the sending and receiving functions of transceiver 28 are performed on common circuitry, whereas in an alternative arrangement, the sending and receiving circuitry is separate. Microprocessor 30 is any programmable device that accepts analog and/or digital signals or data as input, processes it according to instructions stored in its memory 32, and provides results as output. Microprocessor 30 receives signals from transceiver 28, and/or wireless access point 12 and processes them according to its instructions stored in its memory 32 and then sends signals back to transceiver 28 instructing transceiver 28 to transmit control signals to other components of system 10 through antenna 34. Antenna 34 is any electrical device which converts electric power into radio waves or electromagnetic waves and/or vice versa. In transmission, a radio transmitter supplies an oscillating radio frequency electric current to the antenna's terminals, and the antenna radiates the energy from the current as electromagnetic waves or electronic signals (radio waves). In reception, an antenna intercepts some of the power of an electromagnetic wave or electromagnetic signal in order to produce a tiny voltage at its terminals that is applied to a receiver/transceiver 28.

In one arrangement, microprocessor 30 and transceiver 28 communicate with one another using digital signals, such as 1 s and 0 s, whereby transceiver 28 communicates with other components of this system 10 using electromagnetic signals or electromagnetic waves. In one arrangement, the electromagnetic wave or electromagnetic signal is in the range of 433 MHz radio wave, also known as radio frequency waves (RF). In another arrangement, any other electromagnetic wave and/or frequency is used. Hereinafter, this electromagnetic wave or electromagnetic signal will simply be referred to as an "electromagnetic signal", regardless of its form or protocol, however, this term is not meant to be limiting in any way. This signal is either digital or analog and can be of any wave length, including AM and FM signals or the like.

A plurality of motorized window coverings 36 are electronically connected to the system. In one arrangement, these motorized window coverings 36 are roller shades 36R manufactured by QMotion incorporated located at 3400 Copter Road, Pensacola, Fla., 32514 USA. These QMotion shades are the subject of various US patents which are fully incorporated by reference herein including all related parent or children patents or applications whether issued or pending including: U.S. Pat. No. 8,299,734 entitled High Efficiency Roller Shade, filed on Feb. 23, 2010; and U.S. Pat. No. 8,368,328 entitled Method for Operating a Motorized Roller Shade, filed on Feb. 23, 2010. Any other form of a motorized window covering 36, whether battery powered or powered by electrical connection is hereby contemplated for use as part of the system.

As a brief description, when motorized window coverings 36 are roller shades 36R these roller shades include a generally centrally positioned tube 38 with shade material 40 wrapped around the tube 38. When actuated, window covering 36 rotates upon axis point 42, such as axels that extend outwardly from the ends of tube 38 thereby wrapping or unwrapping shade material 40 around tube 38. In one arrangement, window coverings 36 are wireless and battery powered, and include an internal power source 44, such as a plurality of batteries stacked within a battery tube which is positioned within the tube 28 or a battery pack positioned within the tube 28. In another arrangement, window coverings 36 are connected to an external power source, such as conventional wired power.

Another form of motorized window covering 36 contemplated for use with the system includes a dual roller shade 36B arrangement such as that manufactured by QMotion incorporated located at 3400 Copter Road, Pensacola, Fla., 32514 USA and presented in U.S. Patent Application Pre Grant Publication No. 2013/0306250 A1 published on Nov. 21, 2013 and filed on May 18, 2012 entitled Multiple Shade Apparatus and Method, which is fully incorporated by reference herein including any related applications. As is presented therein, this dual roller shade 36B arrangement includes a blackout shade material 40$b$, which generally blocks most or all light from coming through the window, and a sheer shade material 40$s$, which is generally allows a portion of the light to transfer through the material. The blackout shade material 40$b$ and the sheer shade material 40$s$ are connected to their own roller tube 38 which in one arrangement include their own motors and can be independently deployed and raised. In an alternative arrangement, only one of these roller tubes 38 includes their own motor and can be independently raised and lowered, however the system includes a mechanism to connect to the other shade material (40$b$ or 40$s$) thereby allowing both shades (40$b$ and 40$s$) to be deployed at a single time. This arrangement allows a user to deploy black out shades 40$b$ and/or sheer shades 40$s$ using a single motorized window covering device 36.

Another form of motorized window covering 36 contemplated for use with the system includes a honeycomb shade 36H arrangement such as that manufactured by QMotion incorporated located at 3400 Copter Road, Pensacola, Fla., 32514 USA and presented in U.S. Patent Application Pre Grant Publication No. 2012/0090797 A1 published on Apr. 19, 2012 and filed on Oct. 18, 2010 entitled Motorizable Shade System and Method, which is fully incorporated by reference herein including any related applications. As is presented therein, this honeycomb shade 36H arrangement includes a honeycomb or pleated shade material 40$h$, and a wirelessly controlled battery powered motor is positioned in the head rail that raises and lowers the honeycomb or pleated shade material 40$h$.

Another form of motorized window covering 36 contemplated for use with the system includes a Venetian shade 36V arrangement such as that manufactured by QMotion incorporated located at 3400 Copter Road, Pensacola, Fla., 32514 USA and presented in U.S. Patent Application Pre Grant Publication No. 2013/0255890 A1 published on Oct. 3, 2013 and filed on Jun. 3, 2013 entitled Motorizable Tilt Shade System and Method, which is fully incorporated by reference herein including any related applications. As is presented therein, this Venetian style shade 36V arrangement includes slat-type shade material 40v that is formed of a plurality of slats separated by one another by ladders and suspended by suspension cords. This slat-type shade material 40v is raised and lowered by a motor in the head rail that raises and lowers the suspension cords; and the slat-type shade material 40v is tilted by a motor in the head rail that tilts the ladders.

Another form of motorized window covering 36 contemplated for use with the system includes a drapery 36D arrangement such as that manufactured by QMotion incorporated located at 3400 Copter Road, Pensacola, Fla., 32514 USA, and presented in U.S. patent application Ser. No. 14/029,210 filed on Sep. 17, 2013 entitled Rotatable Drive Element For Moving A Window Covering, which is fully incorporated by reference herein including any related applications. As is presented therein, this drapery 36D arrangement includes a drapery rod that supports and opens and closes drapery shade material 36D. This drapery 36D includes batteries and a motor positioned within the support rod or drapery tube.

Another form of motorized window covering 36 contemplated for use with the system includes what is known as a zebra shade 36Z. Zebra shades 36Z are formed of a single panel of shade material 40 that extends from the head rail down to a bottom bar and loops back to the head rail. The shade material 40 includes sections of sheer material 40S and sections of blackout material 40B (which may or may not completely block out all light, but it is denser than the sheer material 40S). These sections of sheer material 40S and blackout material 40B are positioned in staggered parallel spaced alignment to one another. In this way, the zebra shade 36Z can be positioned in an arrangement wherein the two layers of shade material 40 are aligned with one another, such that the two layers of sheer material 40S and the two layers of blackout material 40B are positioned in alignment with one another thereby allowing light and sight to travel through the sheer material portions 40s (this arrangement makes the zebra shade 36Z appear to have stripes (like a zebra)). Alternatively the zebra shade 36Z can be positioned in an arrangement wherein the two layers of shade material 40 are staggered with one another, such that the two layers of blackout material 40B are positioned in staggered alignment with one another thereby providing the appearance that the entire shade material 40 is blackout shade material 40B. Alternatively, the zebra shade 36Z can be positioned in partial staggered alignment. In addition to controlling the amount of stagger between the sheer material 40S and the blackout material 40B the zebra shade 36Z can also be opened and closed by raising the bottom bar by retracting the shade material into the head rail.

To control a zebra shade in the manner described herein the motorization components and the application 58 must have extremely precise control so as to accurately position the portions of the sheer material 40s and the blackout material 40b in the desired position.

While differences in structure and function exist between these different types of motorized window coverings 36R, 36B, 36H, 36V, 36D, commonalities exist that allow these devices to be controlled by the system 10 described herein. Therefore, when reference is made to a motorized window covering 36 hereafter, such reference shall apply to any and all of the types of motorized window coverings 36R, 36B, 36H, 36V, 36D, unless specifically stated otherwise.

Motorized window coverings 36 have a control module 46. Control module 46 communicates with wireless access point 12 and controls the operation of motorized window covering 36. Control module 46 is formed of any suitable arrangement and includes any and all necessary components to function properly. In one arrangement, control module 46 includes an antenna 48, which is similar or identical to antenna 34; a transceiver 50, which is similar if not identical to transceiver 28; and a microprocessor 52 with memory 54, which is similar if not identical to microprocessor 30 and memory 32. Control module 46 is also electronically connected to power source 44 which supplies power to the needed components of motorized window covering 36. At least one motor 56 is also connected to and controlled by control module 46 which converts electrical energy to mechanical energy thereby actuating the opening or closing or other function of the motorized window covering 36.

Assembly:

Wireless access point 12 is connected to router 14. At least one wireless device 16, such as a smart phone or wireless computer is wirelessly connected to access point 12 such that the two devices communicate and exchange information with one another through over-the-air two-way communication. Alternatively and/or in addition to, a wired device 18, such as a desktop computer is connected to wireless access point 12. Wireless access point 12 is connected via cable 22 to gateway 20, which is also connected to power source 24. A plurality of motorized window coverings 36 are assembled and installed within effective over-the-air communication distance to gateway 20 and wirelessly connected to the gateway 20 via over-the-air two-way communication through antennas 34/48 and transceivers 28/50.

Figure 4:
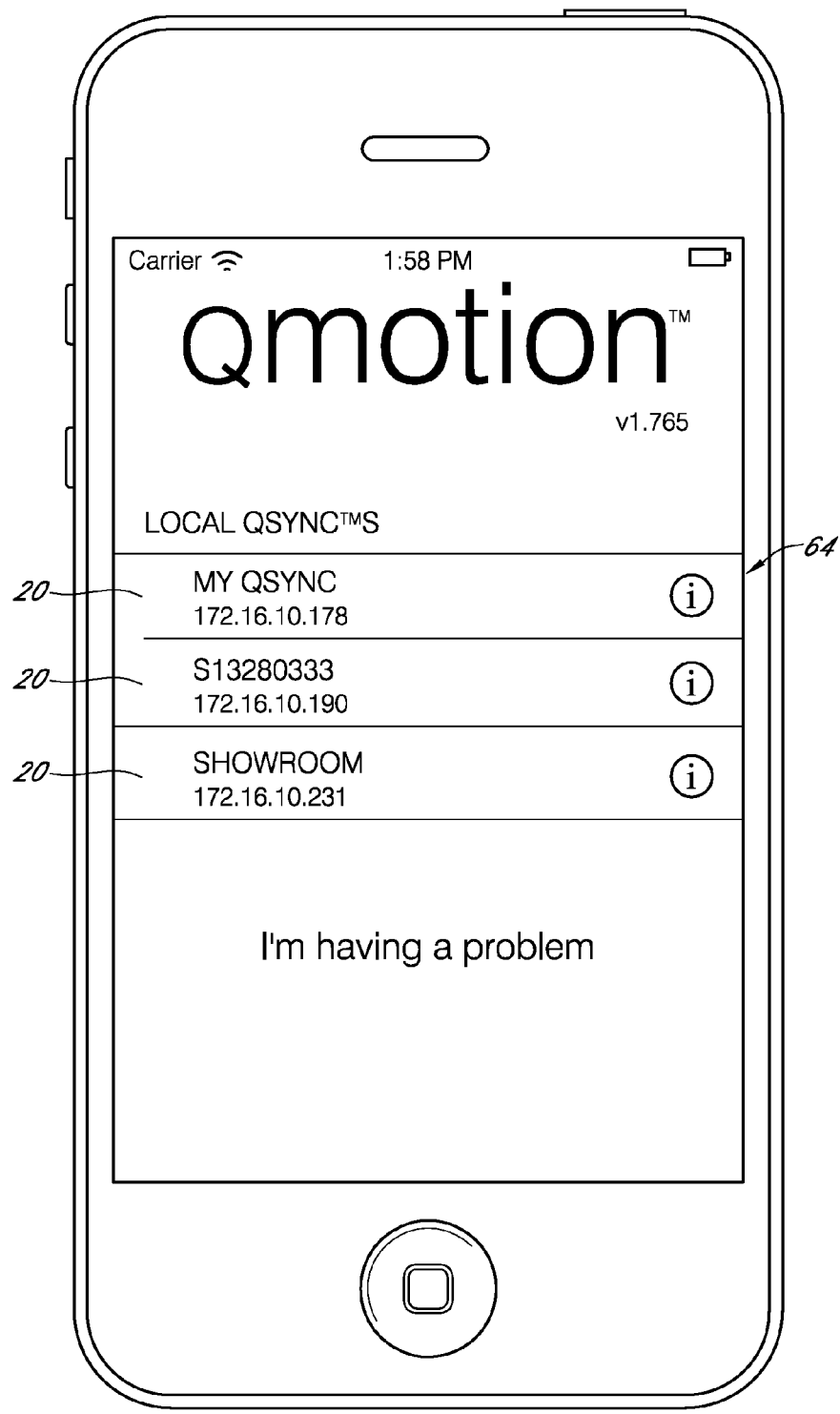
FIG. 4 is a plan view of a screen of an application used with the system, the view showing the home screen of the application wherein a plurality of gateways are presented for selection.

Application:

An application 58 is installed on the wireless device 16 in any conventional manner (while reference is made in the following description only to wireless device 16, the same holds true for wired device 18, or any other electronic device). Once application 58 is installed, wireless device 16 searches for any and all gateways 20 connected to wireless access point 12, wireless network 60 (also known as home network 60) and or wired network 62 and all motorized wireless window coverings 36 which are within communication distance of any gateway 20. With reference to FIG. 4, when one or more gateways 20 are detected by application 58 they appear in gateway selection box 64. At this point, the user chooses a gateway 20 for installation and/or operation by selecting the appropriate gateway 20 from the gateway selection box 64. As is shown in FIG. 4, this can include a plurality of gateways 20 that are connected to the wireless network 60 or wired network 62.

Figure 5:
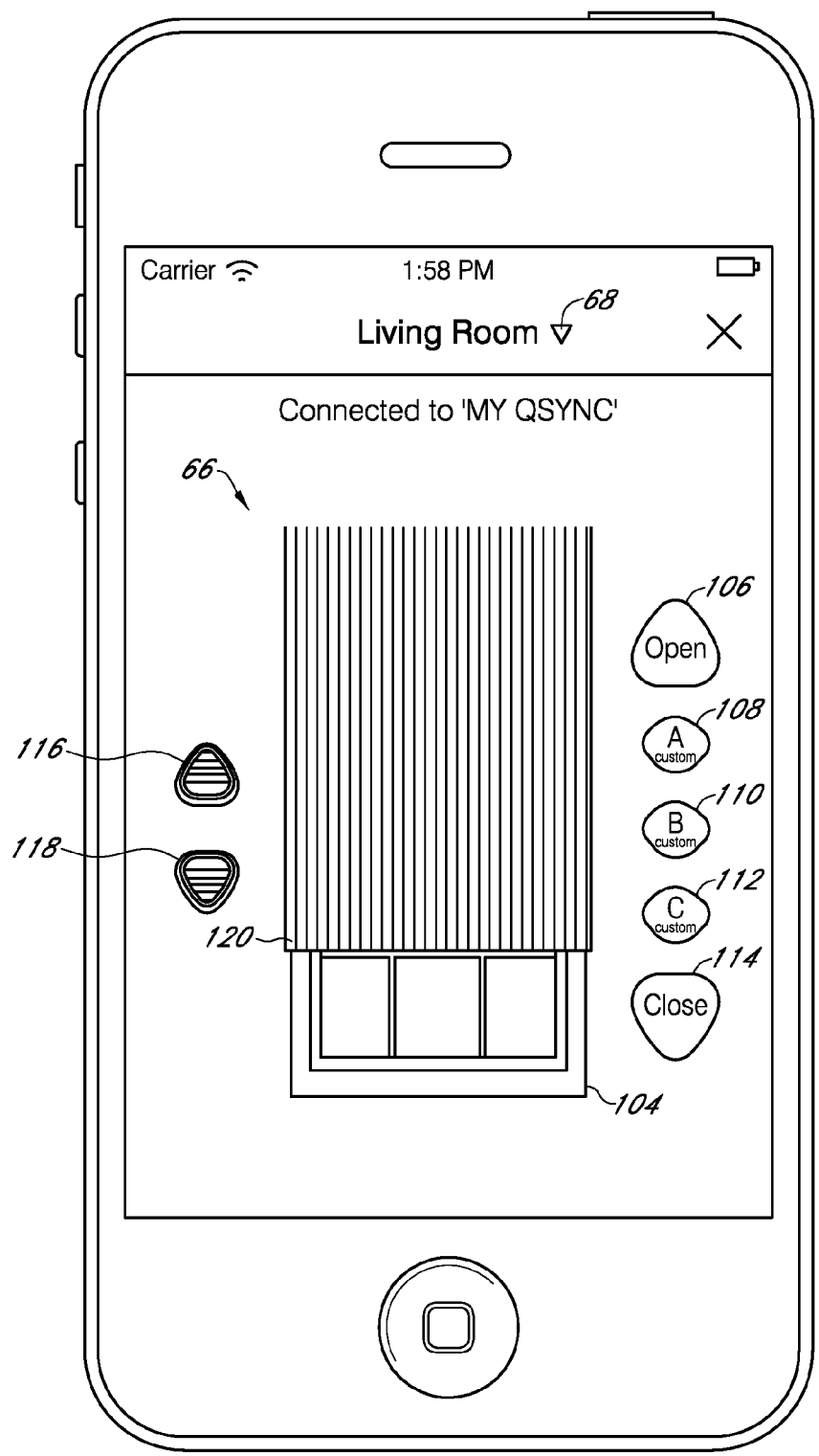
FIG. 5 is a plan view of a screen of an application used with the system, the view showing the interactive window illustration and a plurality of control buttons.

With reference to FIG. 5, once the application 58 is installed and a gateway 20 is selected, the home screen 66 is presented. Next, the user selects the settings button 68 presented on the home screen 66. Once selected, with reference to FIG. 6, the selection page 70 appears.

Once on the selection page 70 the user can select the group or scene button 71 to select between groups 72 and scenes 74. As is presented in FIG. 6, the groups button is selected and a plurality of groups 72 are presented on the screen. Specifically, the "Living Room" group has been selected, as is shown by a highlighted background. Therefore, if the user were to select the done button 76 is selected and application would return to the home screen 66 wherein all motorized window coverings 36 associated with the selected group 72 would be controlled simultaneously, as is further described herein.

On this screen, the user can add additional groups 72 by selecting the add button 78; the user can retrieve information about a particular group 72 by selecting the information button 80; or the user can edit or modify a group 72 by highlighting that group 72 and selecting the edit button 82. As one example, if the user were to highlight the "Living Room" group and press the edit button 82 the user would be presented with the edit screen 84 in FIG. 7.

Figure 7:
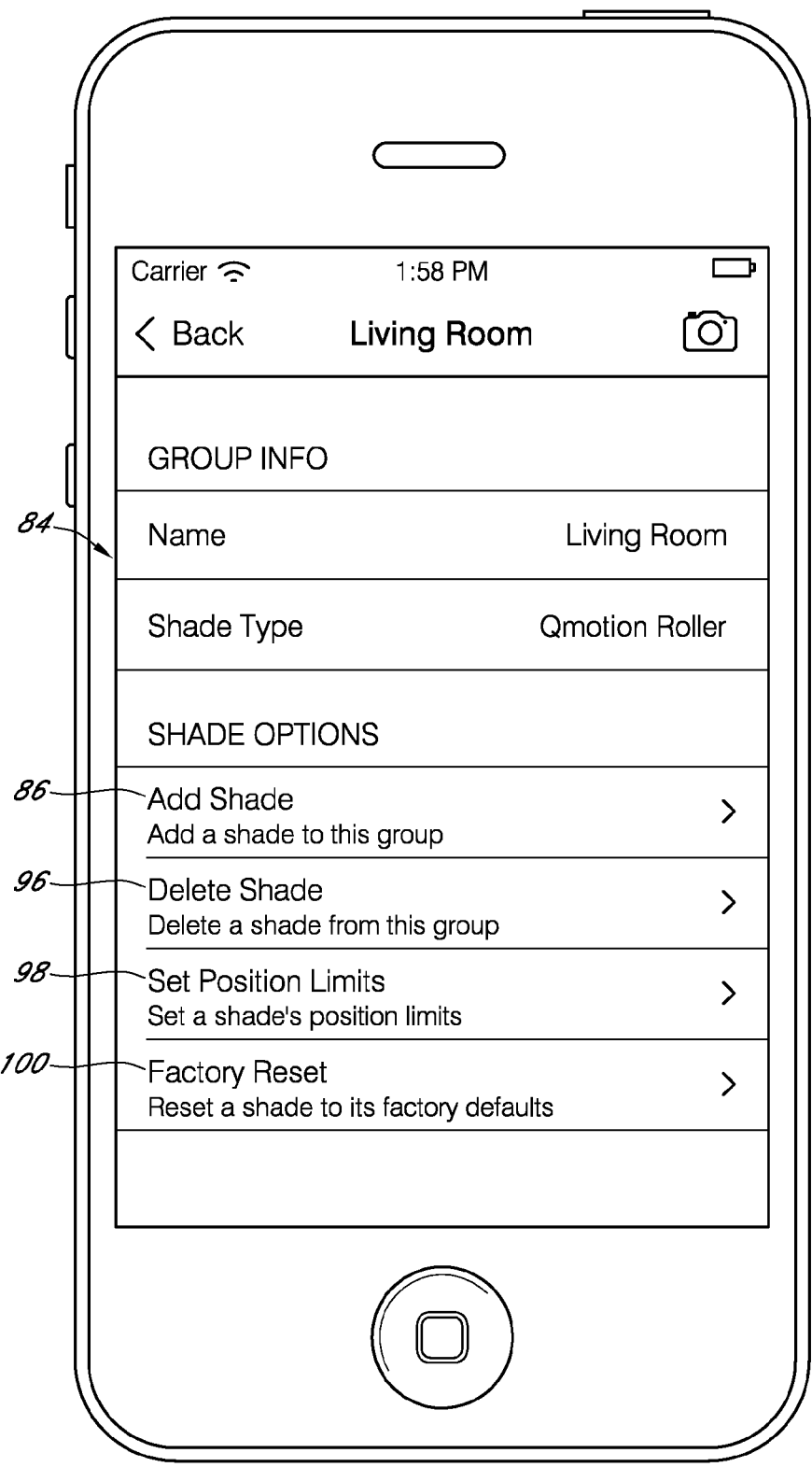
FIG. 7 is a plan view of a screen of an application used with the system, the view showing a screen that allows for modification or addition of a group.
Figure 8:
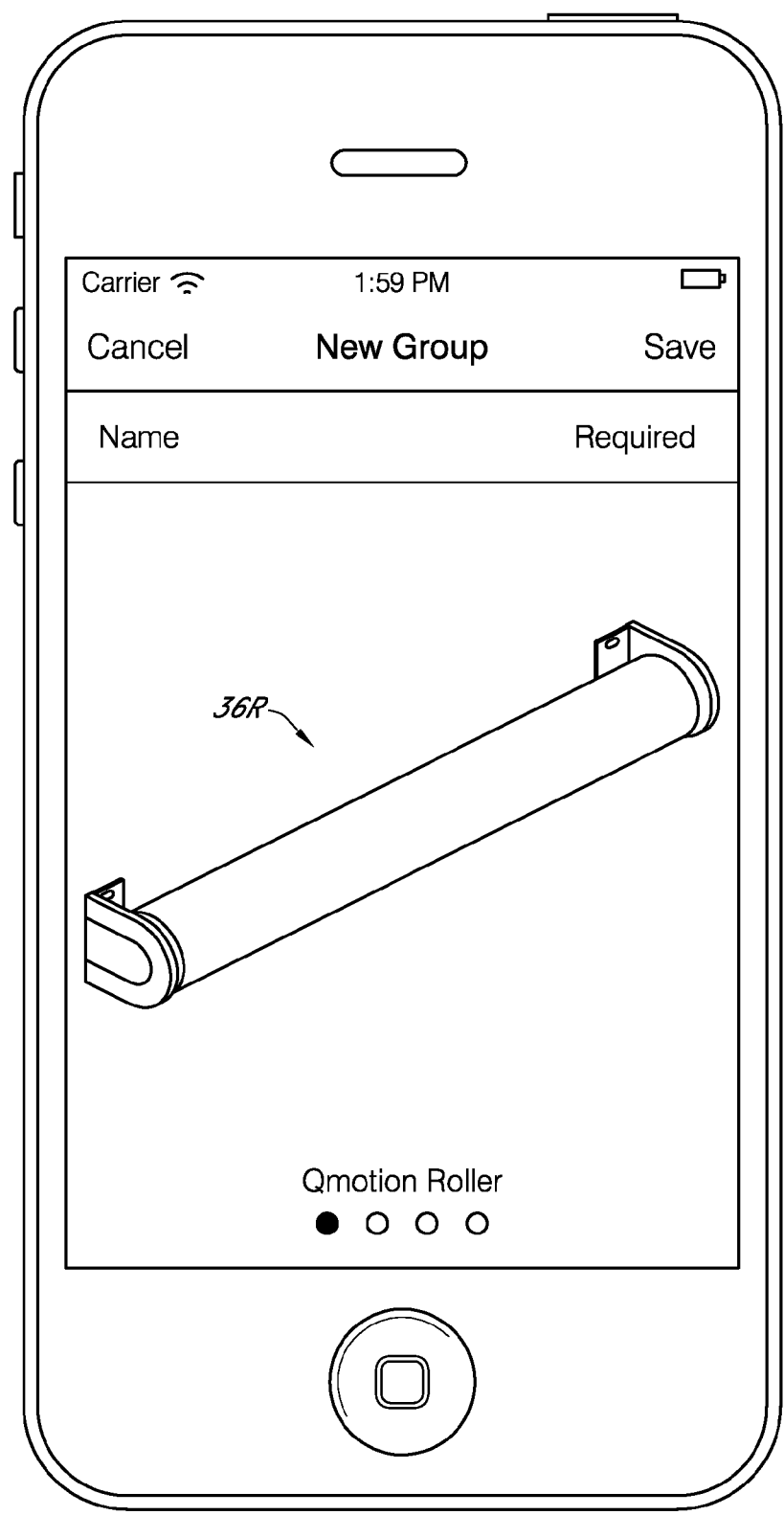
FIG. 8 is a plan view of a screen of an application used with the system, the view showing a roller shade.
Figure 9:
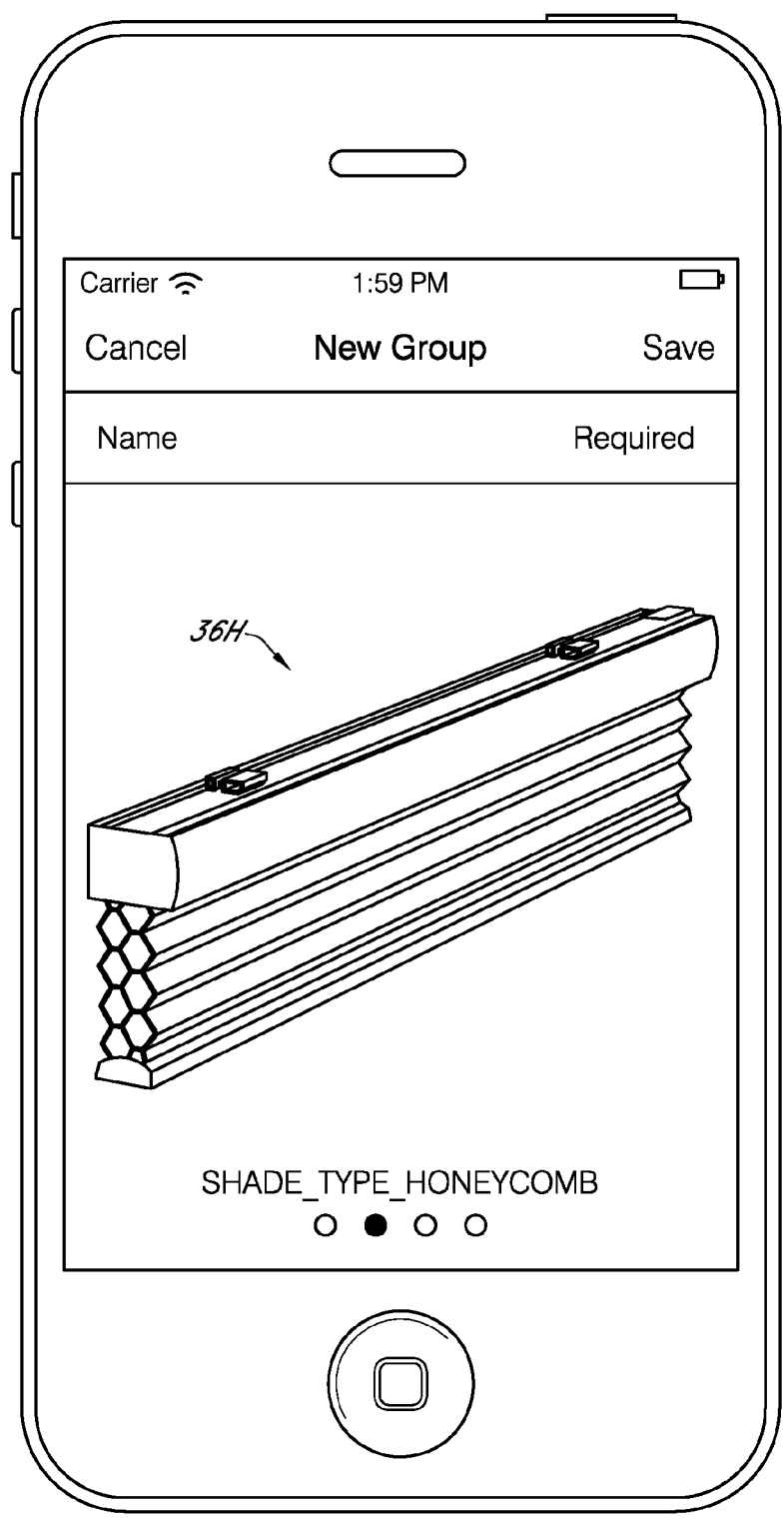
FIG. 9 is a plan view of a screen of an application used with the system, the view showing a honeycomb shade or pleated shade.
Figure 10:
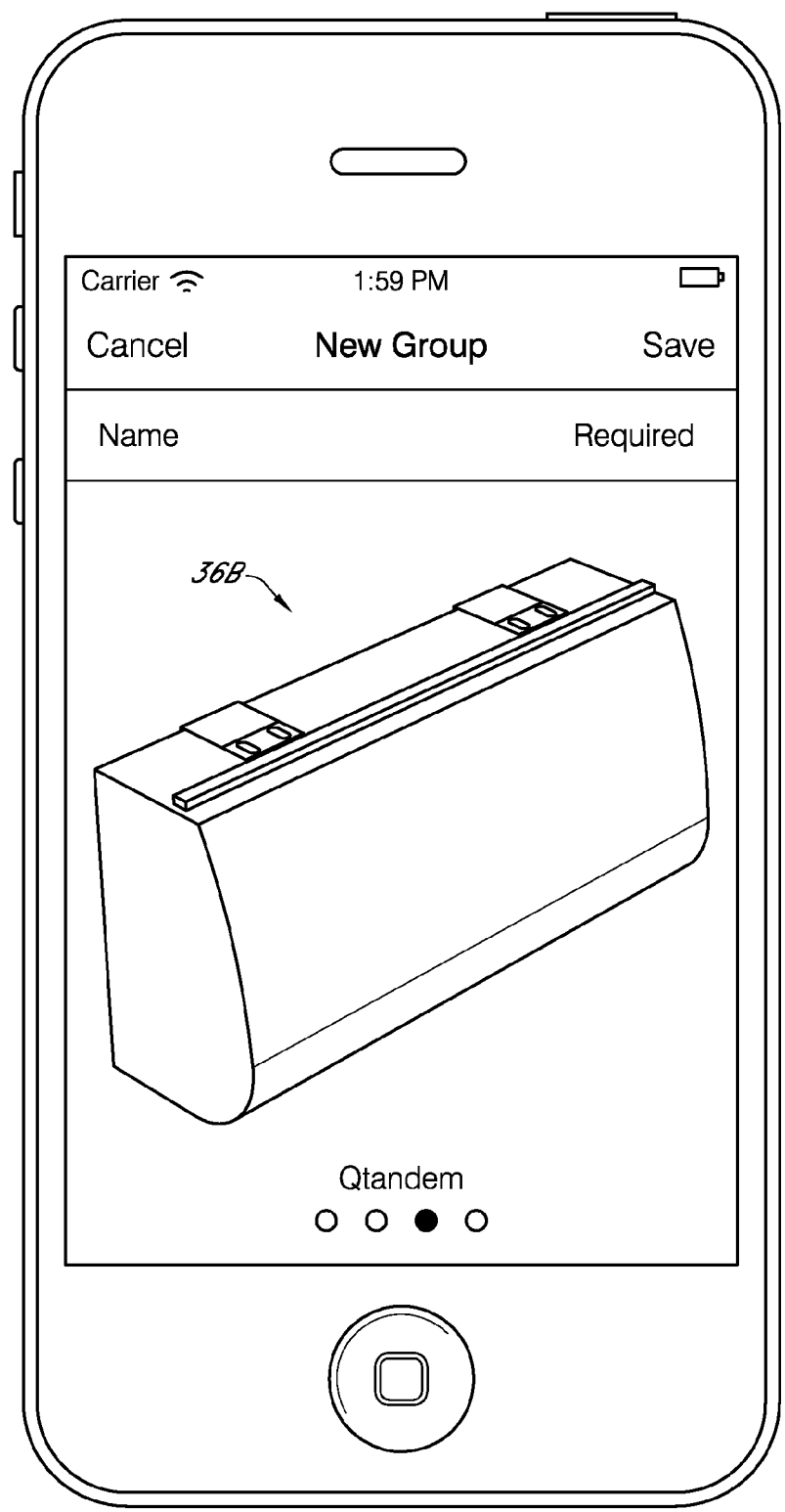
FIG. 10 is a plan view of a screen of an application used with the system, the view showing a dual roller shade.
Figure 11:
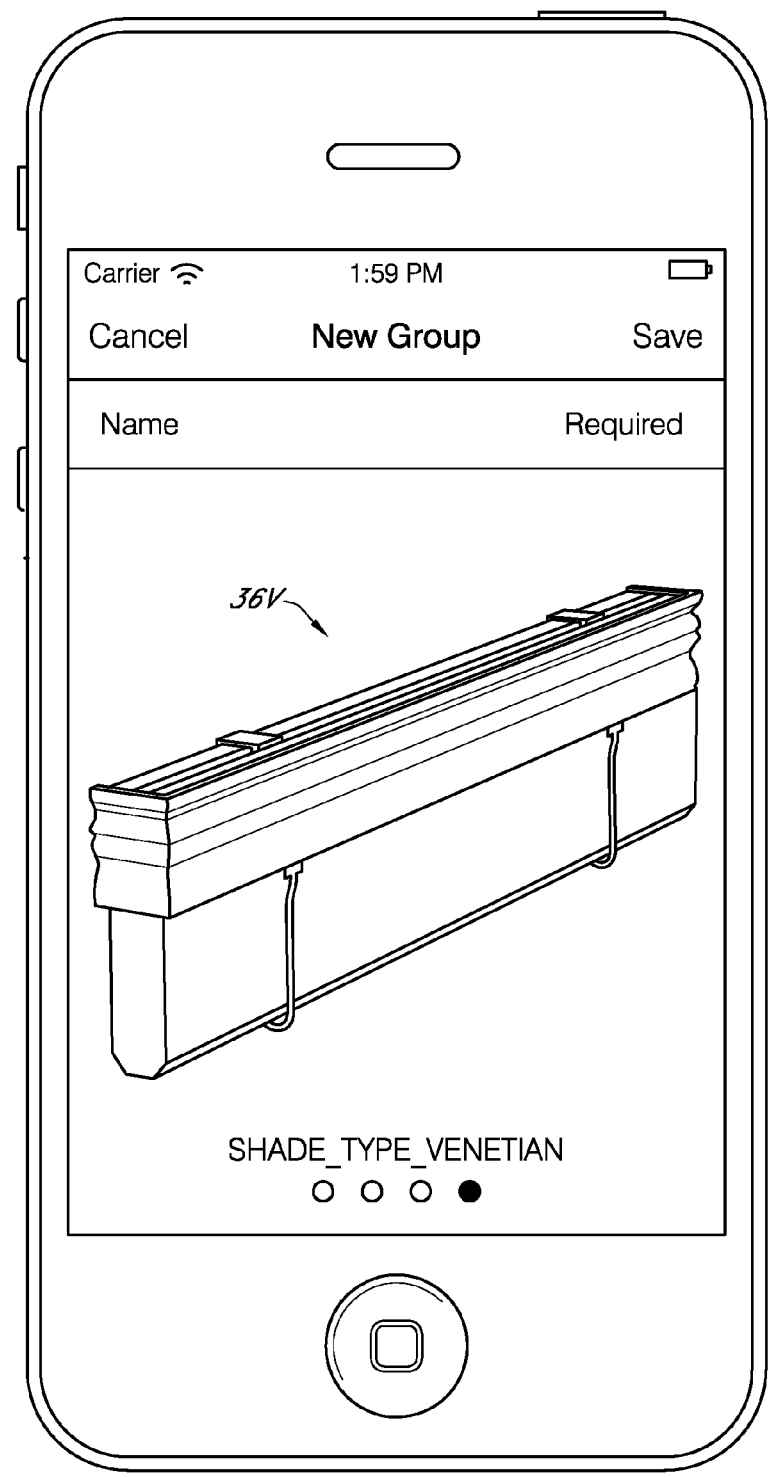
FIG. 11 is a plan view of a screen of an application used with the system, the view showing a Venetian shade.
Figure 12:
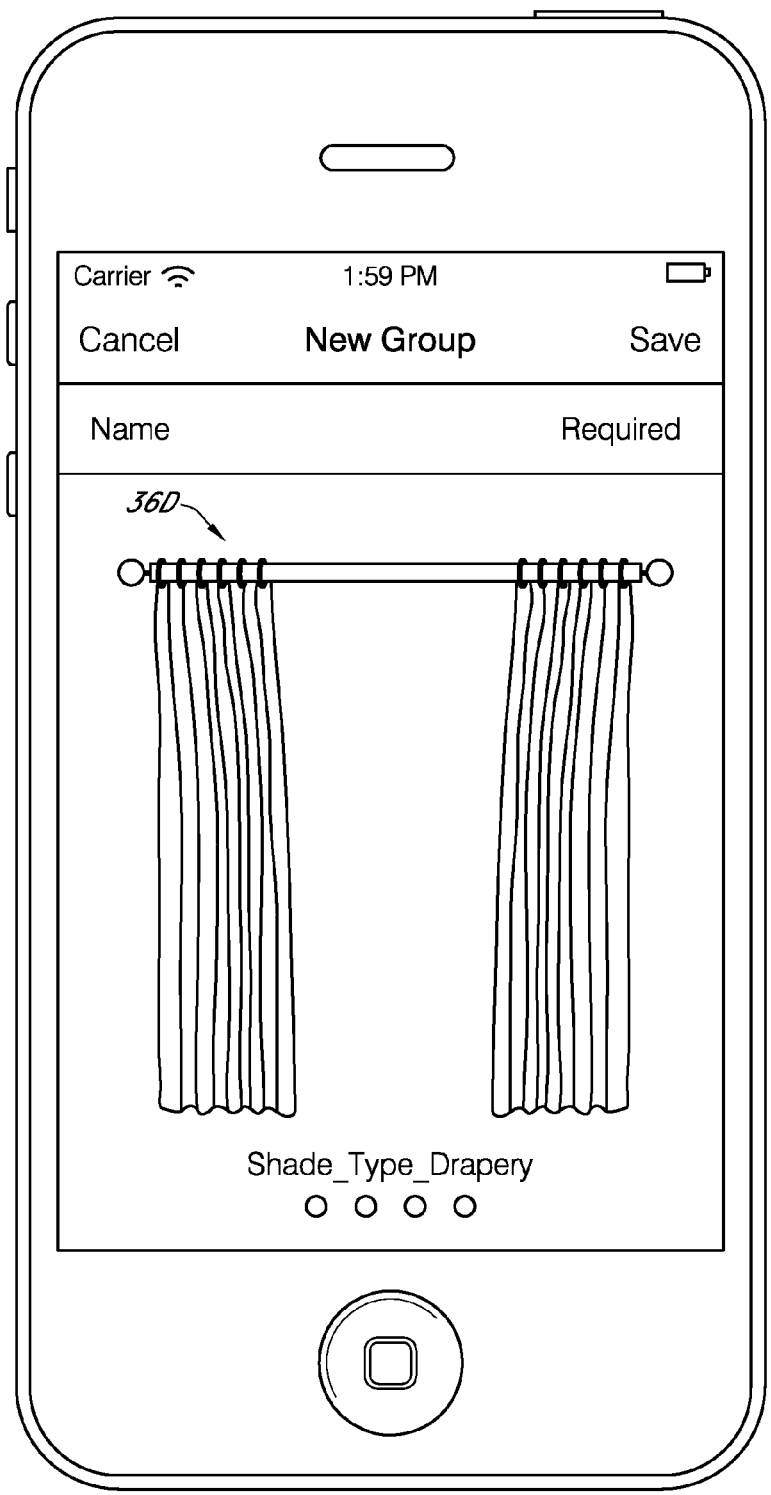
FIG. 12 is a plan view of a screen of an application used with the system, the view showing a drapery shade.
Figure 12A:
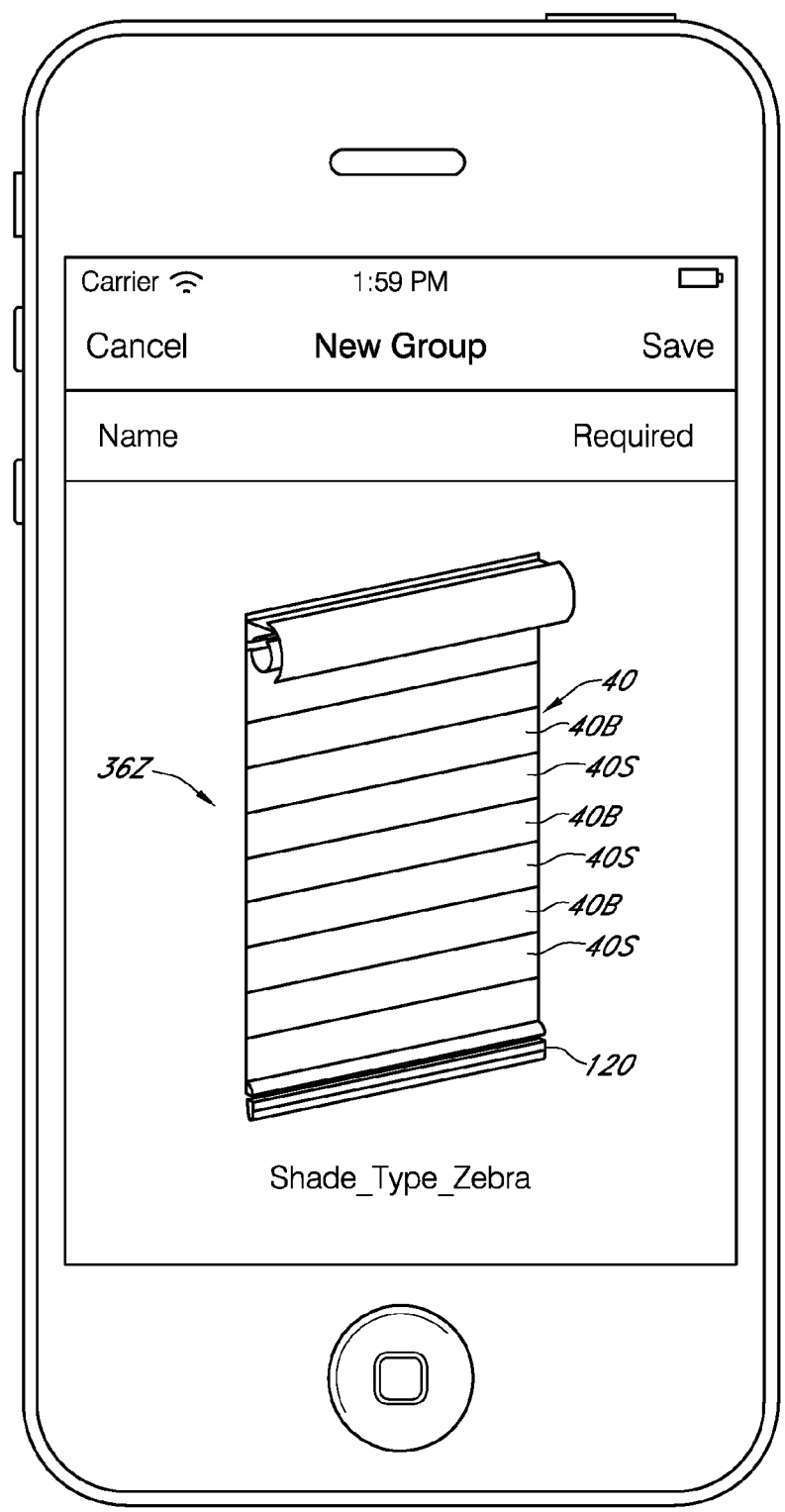
FIG. 12A is a plan view of a screen of an application used with the system, the view showing a zebra shade.

With reference to FIG. 7, the edit screen 84 is presented wherein a user can edit a group 72, in this case, the "Living Room" group, which in this example are all motorized window coverings 36 in the user's living room of their home. On the edit screen 84 the user can add motorized window coverings 36 associated with the selected gateway 20 to the group 72 by selecting the add shade button 86. Once the add a shade button 86 is selected, the user is presented with a number of options as to what kind of motorized window covering 36 is being added. The options are, a roller shade 36R (FIG. 8), a honeycomb shade or pleated shade 36H (FIG. 9), a dual roller shade 36B (FIG. 10), a Venetian shade 36V (FIG. 11) or a drapery 36D (FIG. 12), among other styles.

Figure 13:
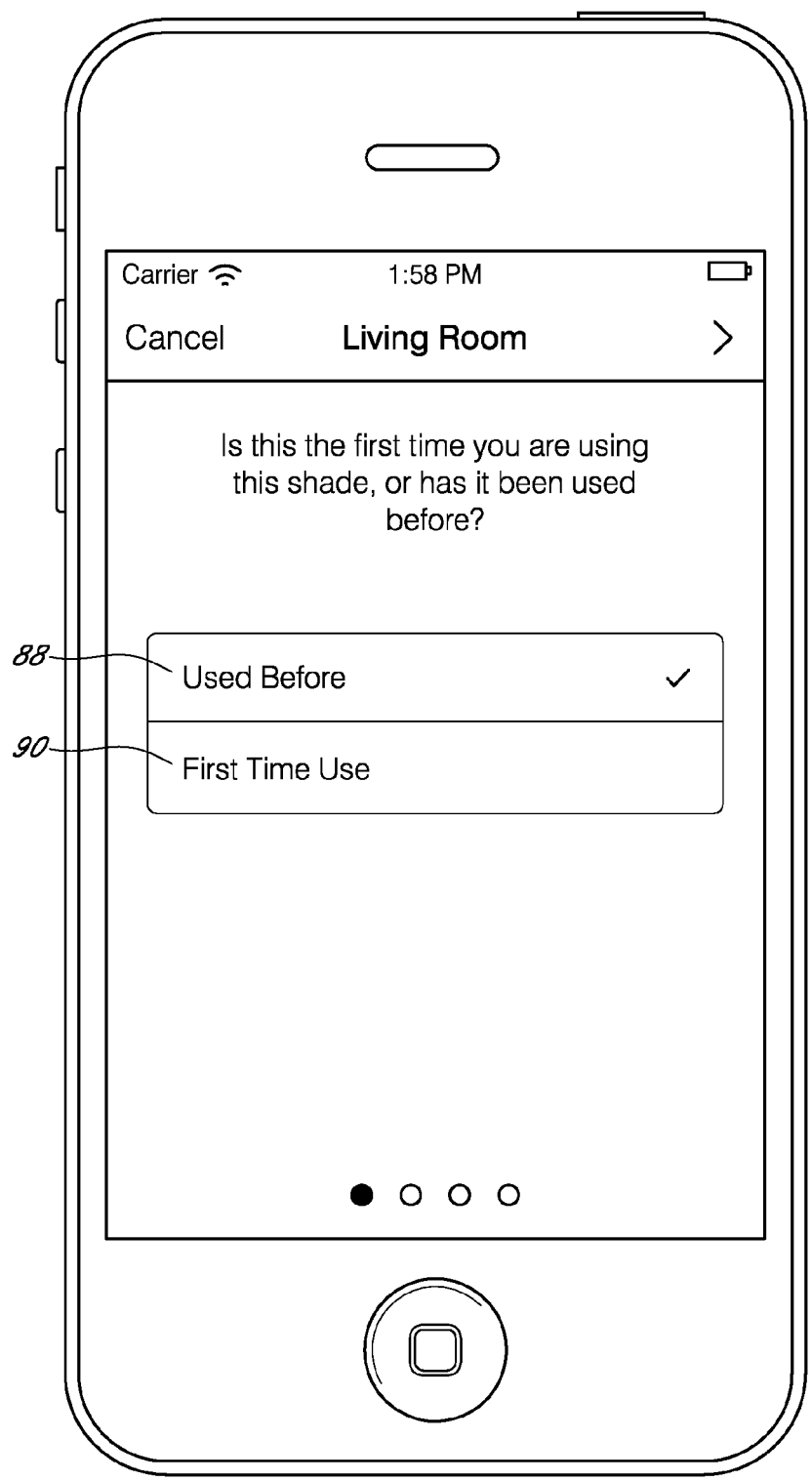
FIG. 13 is a plan view of a screen of an application used with the system, the view showing a set-up screen.

Once the type of motorized window covering 36 is selected, the user associates the particular motorized window covering 36 with the application 58 and the application 58 automatically displays the screen shown in FIG. 13. On FIG. 13, the user must inform the application 58 whether the motorized window covering 36 that is being added has been leaned to the application 58 (that is, the particular motorized window covering 36 being added to the group 72 is already associated with and controlled by application 58 as part of a different group 72 or as part of a scene 74). To do so, the user selects the Used Before button 88 or the First Time Use button 90. If the user selects the Used Before button 88, the user is presented with a list of all learned motorized window coverings 36, that match the type selected (36R, 36H, 36B, 36V, 36D) and the user selects the desired motorized window covering 36 which is then associated with the group 72.

Figure 14:
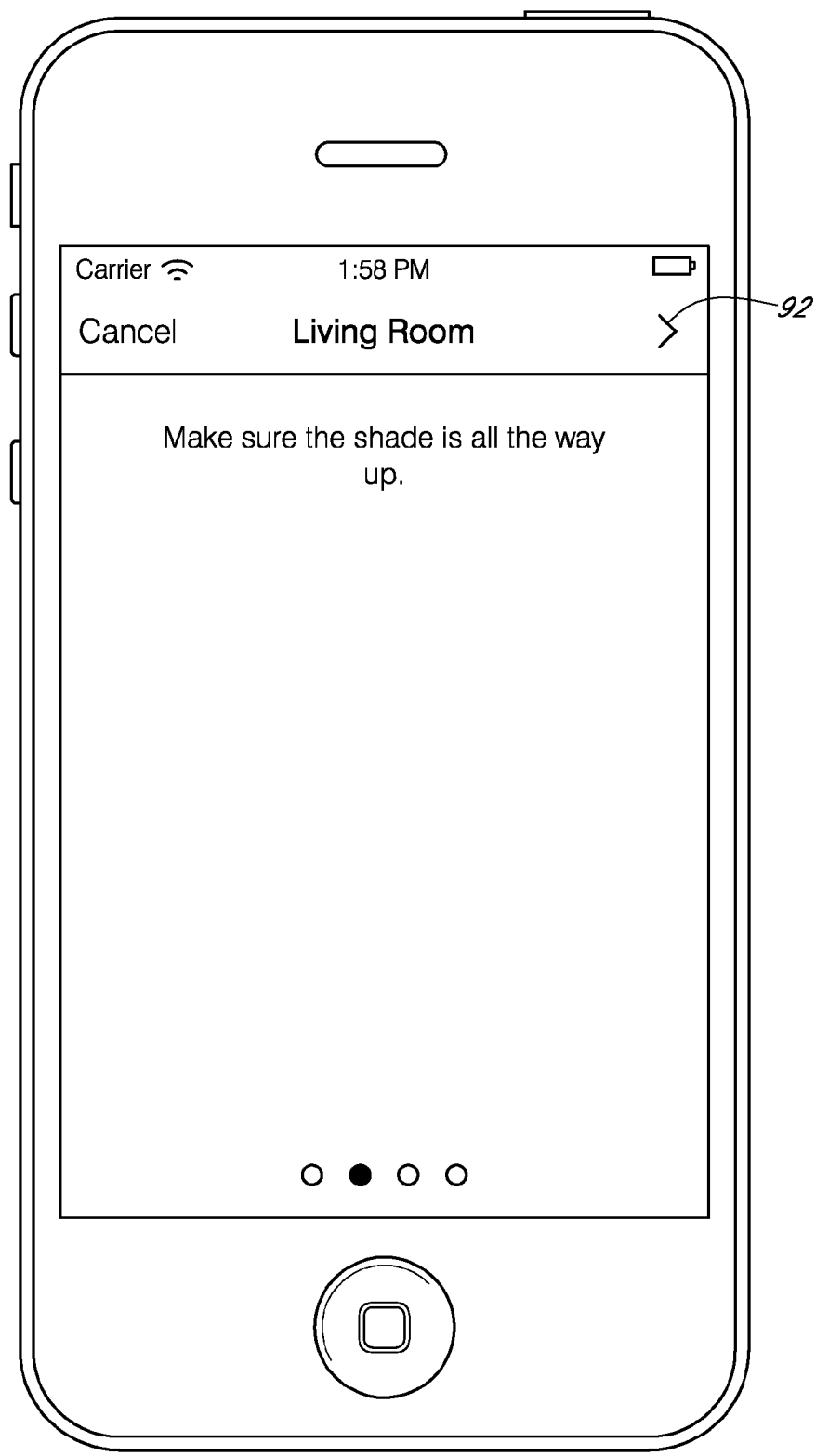
FIG. 14 is a plan view of a screen of an application used with the system, the view showing a FIG. 15 is a plan view of a screen of an application used with the system, the view showing a set-up screen.

In the event the user is adding a new and previously unlearned motorized window covering the user selects the first time use button 90 and the application 58 automatically walks the user through the learning process which begins at FIG. 14 which requires the motorized window covering 36 to be all the way up or all the way open. Once this is accomplished, the user selects the next button 92.

Figure 15:
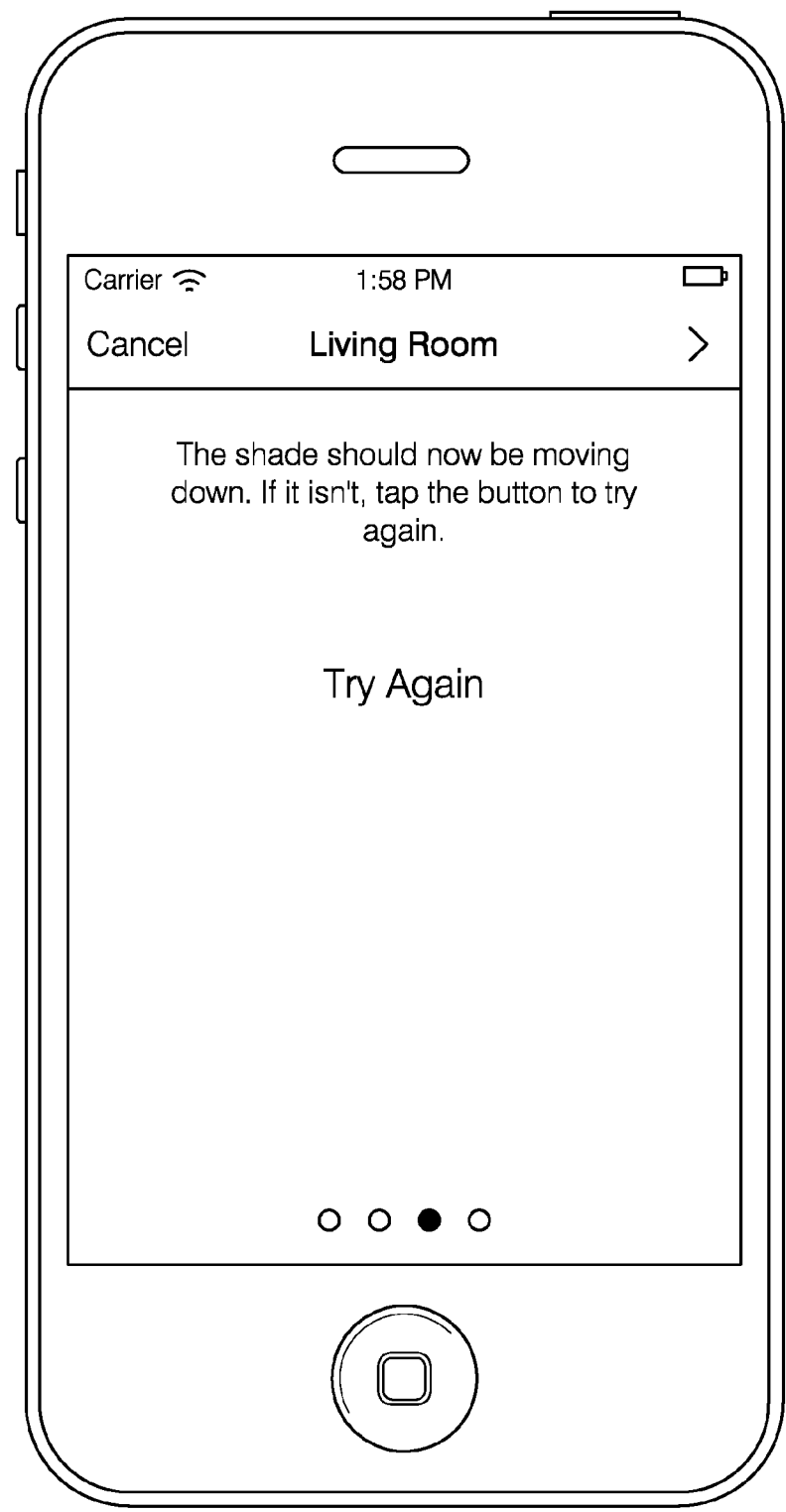

Simultaneously with selection of the next button 92 on FIG. 14, the application 58 will display the window shown in FIG. 15 while the application 58 transmits learn mode control signals to wireless access point 12 which transmits the learn mode control signals to gateway 20 which transmits the learn mode control signals to the motorized window coverings 36 within over-the-air communication distance to the gateway. Once the motorized window coverings receive these learn mode control signals, the motorized window coverings 36 enter learn mode. As one example, the shades move down or move up and down to signify to the user that they are in learn mode.

Figure 16:
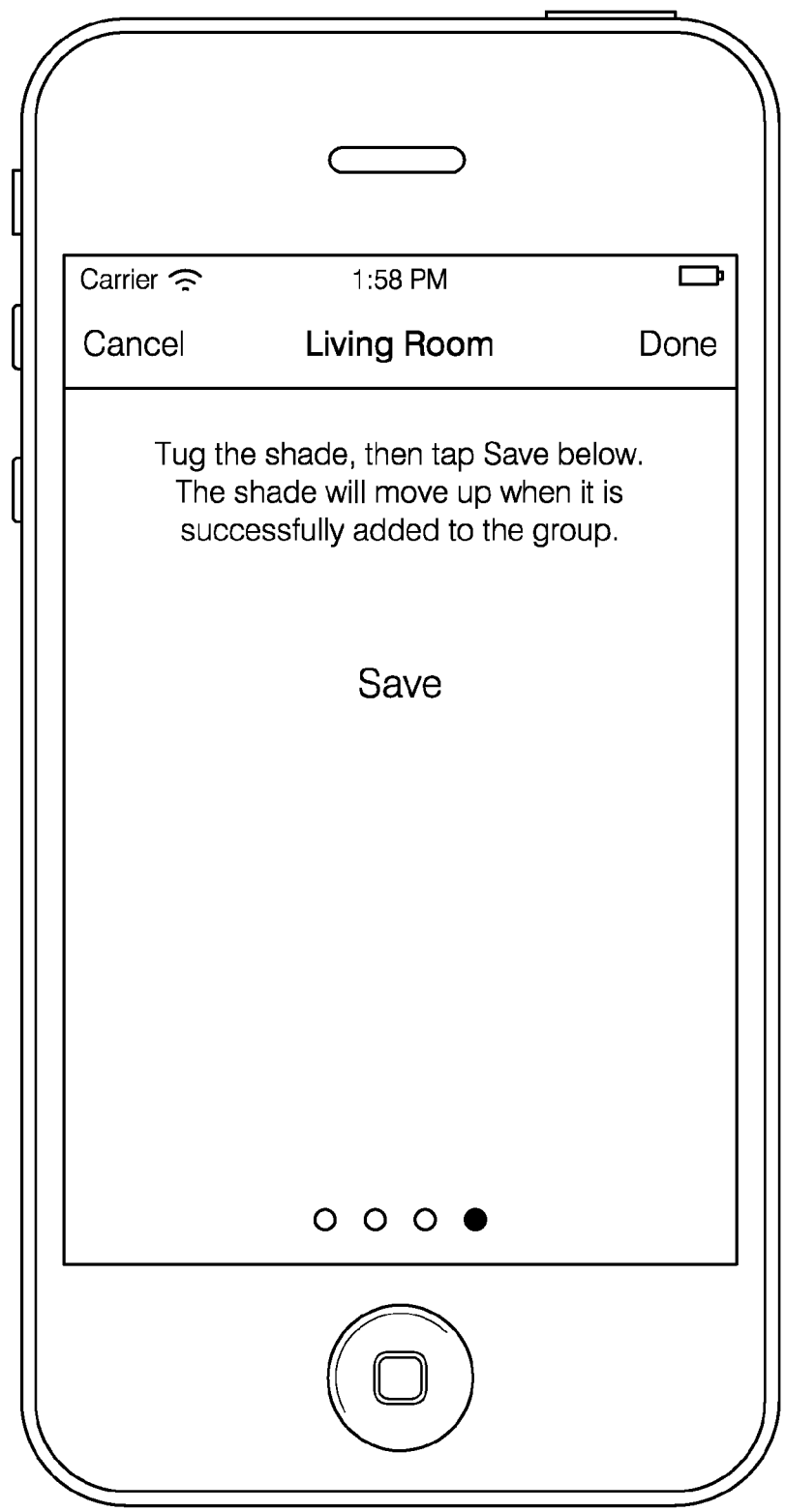
FIG. 16 is a plan view of a screen of an application used with the system, the view showing a set-up screen.

After a period of time, the application 58 will display the window shown in FIG. 16 which informs the user to tug the particular motorized window covering(s) 36 that they want to learn to that particular group. When the user tugs, or otherwise activates the motorized window covering(s) 36 they are then preliminarily learned to that group 72. Once done, the user selects the Save button 94 and will respond when that group 72 is activated or controlled. Once the user is done adding motorized window coverings 36 the user is returned to the display of FIG. 7.

Using the display of FIG. 7 the user can delete motorized window coverings 36 from a group 72 by selecting the Delete Shade button 96 which when selected displays a list of motorized window coverings 36 associated with the group 72, any or all of which can be deleted. The user can also set position limits on any or all of the motorized window coverings 36 by selecting the Set Position Limits button 98, which when selected displays a list of motorized window coverings 36 associated with the group 72, the user can then select any or all of these motorized window coverings 36 the user wants to modify the limits of. Once the motorized window coverings 36 are selected, the user is then presented with a display similar to that of FIG. 5, 17, 18 or 19 depending on the type of motorized window coverings 36. From there, the user can set the limits and save them to the group 17. The user can also set or reset the factory defaults on any or all of the motorized window coverings 36 by selecting the Factory Reset button 100, which when selected displays a list of motorized window coverings 36 associated with the group 72, the user can then select any or all of these motorized window coverings 36 the user wants to reset. Once the motorized window coverings 36 are selected, the application automatically restores the factory defaults on the window coverings 36. Once the user has completed setting up the window coverings 36, the user selects the back button 102 and is returned to the selection page 70.

Figure 6:
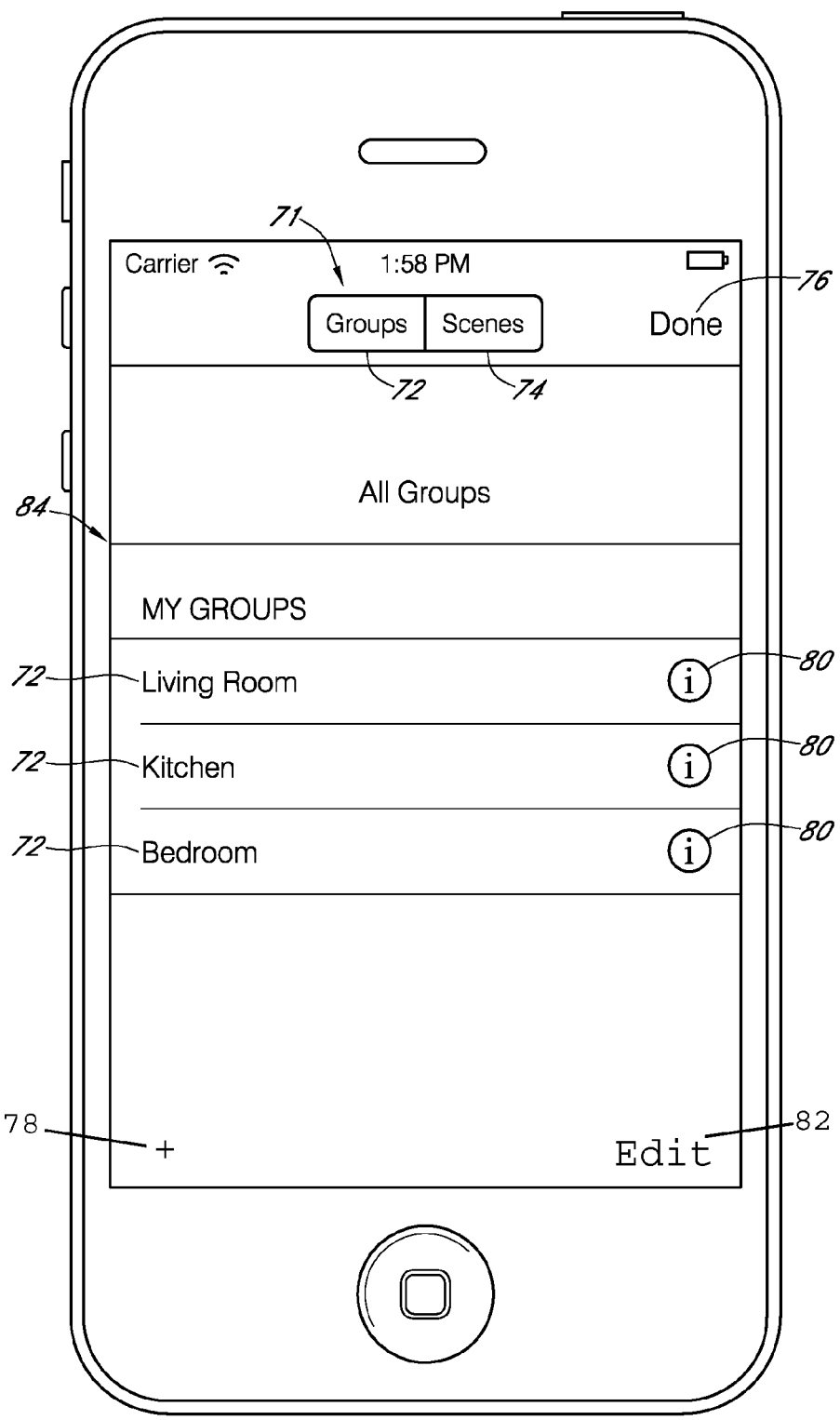

Once the application 58 is set-up, and groups 72 are established with appropriate motorized window coverings 36 associated with each group 72, the user chooses the group 72 they desire to manipulate (see FIG. 6). Once the group 72 is selected, the application 58 displays the appropriate home screen 66 for the particular window coverings 36 that are part of the selected group 72.

Figure 17:
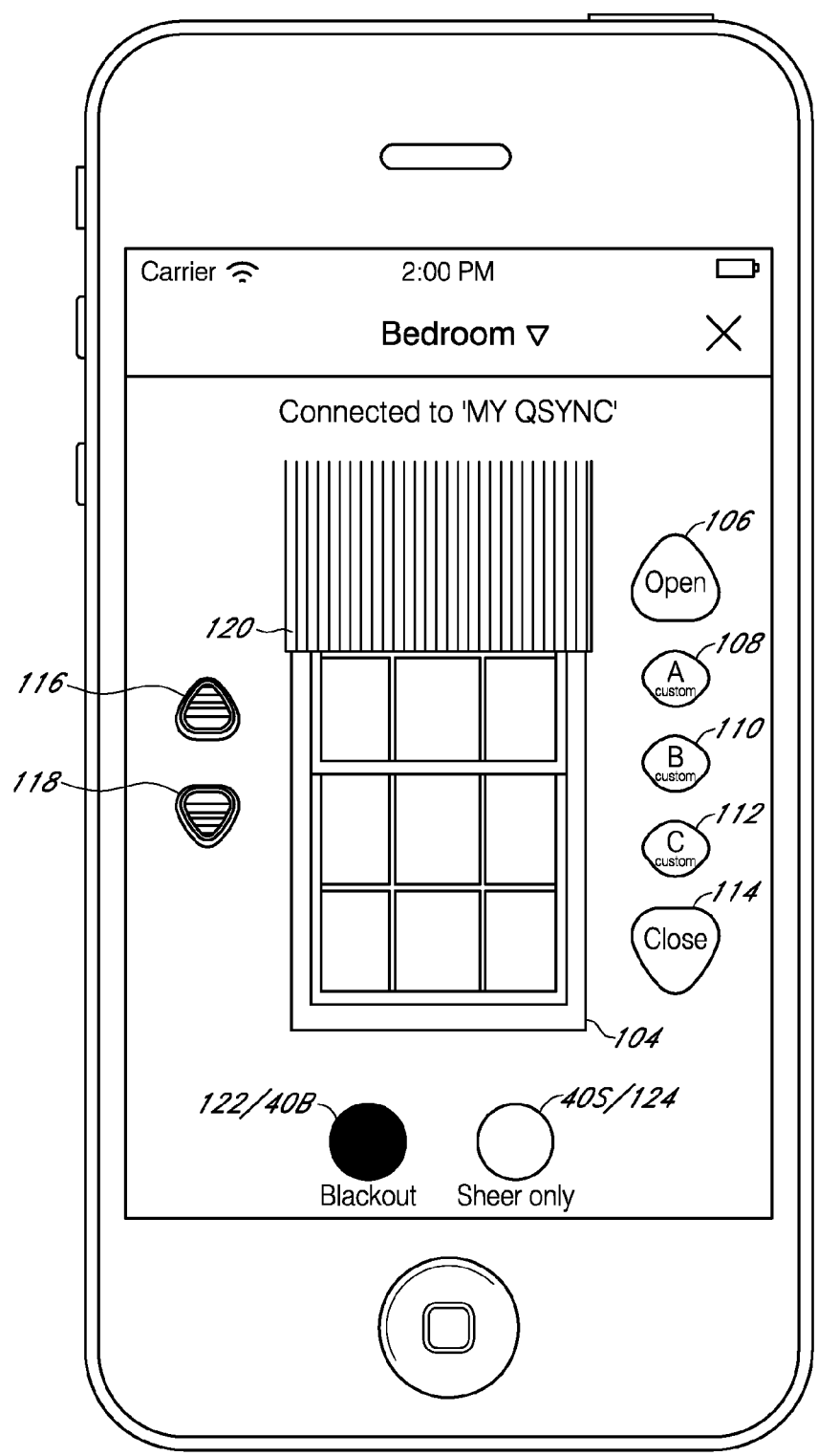
FIG. 17 is a plan view of a screen of an application used with the system, the view showing a control screen for a dual shade having a selection for blackout material and sheer material.
Figure 18:
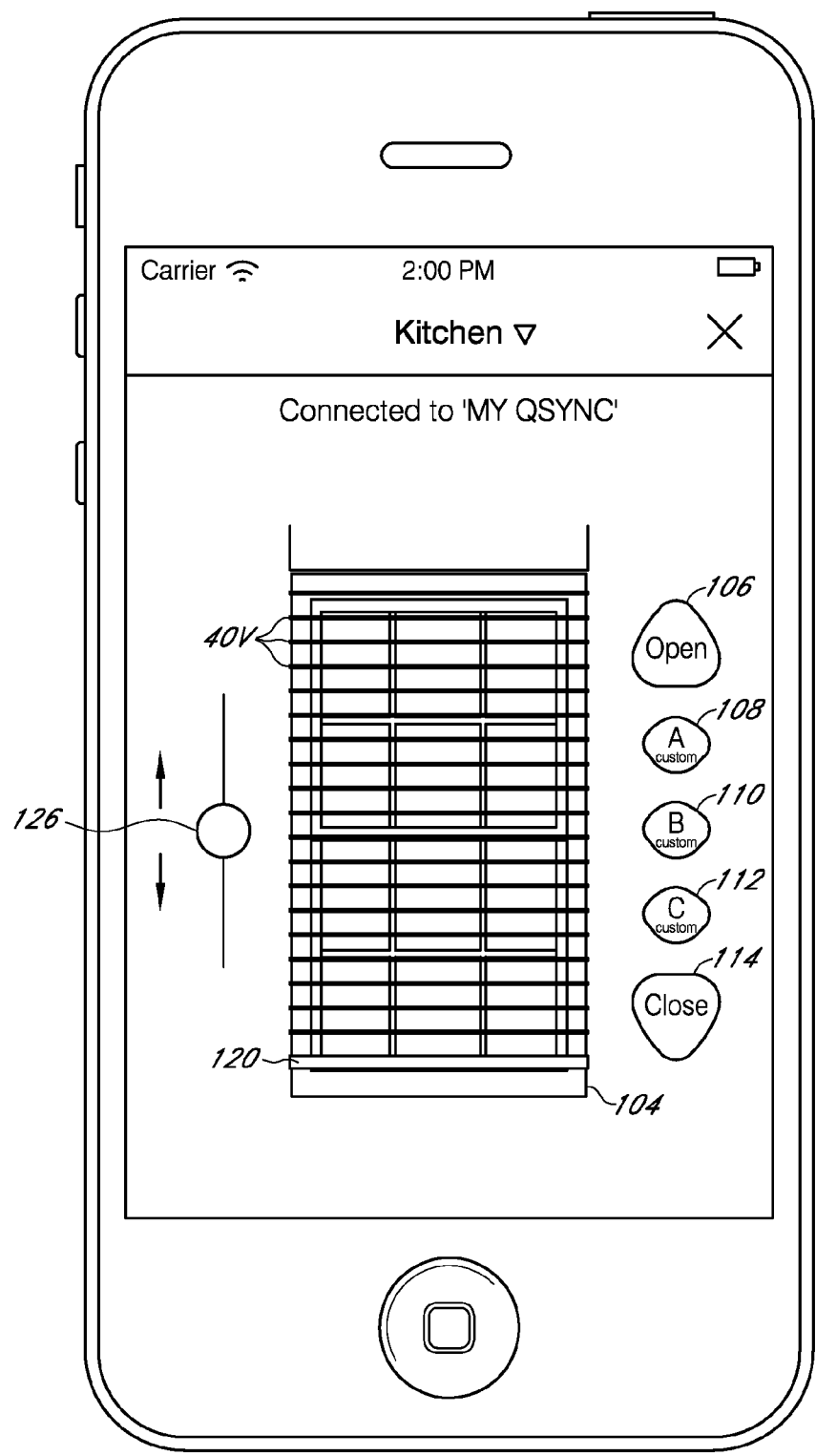
FIG. 18 is a plan view of a screen of an application used with the system, the view showing a control screen for a Venetian shade that allows for control of tilting the slat-type shade material as well as raising of the bottom bar.
Figure 19:
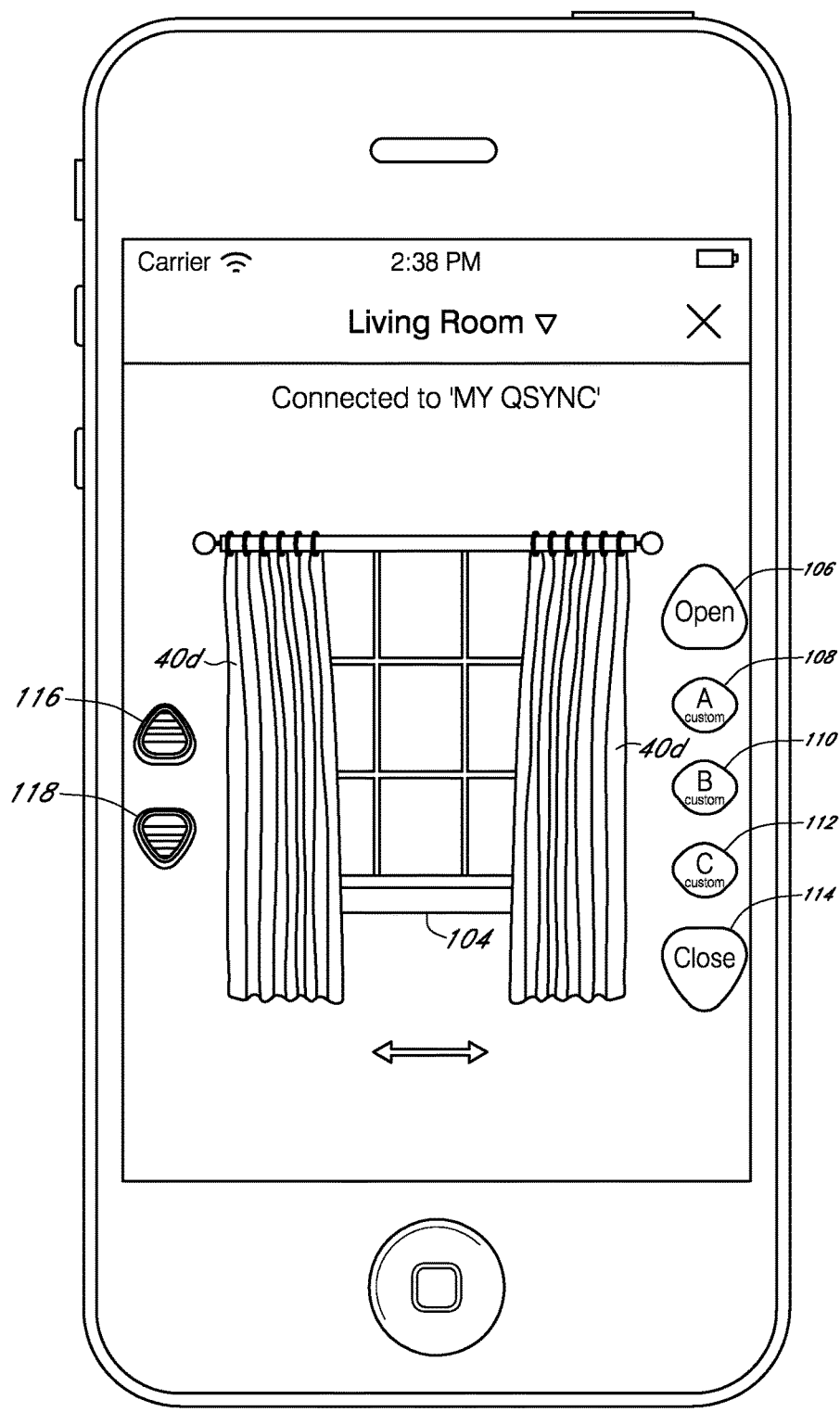
FIG. 19 is a plan view of a screen of an application used with the system, the view showing a control screen for a drapery shade.

The home screens 66 are FIG. 5 for roller shades 36R and/or honeycomb or pleated shades 36H, FIG. 17 for dual roller shades 36B, FIG. 18 for Venetian shades 36V and FIG. 19 for drapery shades 36D.

In the event that roller shades 36R or honeycomb or pleated shades 36H are selected, the home screen 66 is that of FIG. 5. The home screen 66 displays an illustration 104 of a window, a plurality of buttons are presented on either side of the window 104, including an open button 106, a first position button 108, a second position button 110, a third position button 112 and a close button 114. These buttons are presented in descending vertical order, which correspond with their function. That is, the open button 106, when actuated, opens motorized window covering(s) 36 associated with the selected group 72. The close button 114, when actuated, closes motorized window covering(s) associated with the selected group 72. The open and close buttons 106, 114 are intuitively arranged in the form of a triangle or arrow depicting the direction at which the motorized window covering(s) 36 will travel when actuated, that is an up arrow, and a down arrow, respectively. While the open and closed positions are automatically set by the motorized window covering 36, these can be re-set by the user to custom positions.

First, second and third position buttons 108, 110, 112, when actuated, move motorized window covering(s) 36 associated with the selected group 72 to a first predetermined position, a second predetermined position and a third predetermined position, respectively. In one arrangement, these first, second and third predetermined positions are set at approximately 75% open, 50% open (or half open) and 25% open, respectively. While these may be the initial settings, first, second and third predetermined positions 108, 110, 112 are customizable and can be set at any position by the user.

Application 58 includes the option of presenting these buttons 106, 108, 110, 112, 114 on either the left side or right side of window illustration 104 for the convenience and ease of use of both left handed and right handed users. Or alternately, these buttons 106, 108, 110, 112, 114 are simultaneously presented on both sides of window illustration 104 for ambidextrous convenience.

Application 58 also includes a jog up button 116 and a jog down button 118. Like the open button 106 and close button 114, jog up button 116 and a jog down button 118 are intuitively arranged in the form of a triangle or arrow depicting the direction at which the motorized window covering(s) 36 will travel when actuated, that is an up arrow, and a down arrow, respectively. When actuated, jog up button 116 and a jog down button 118 will actuate motorized window covering(s) 36 associated with the selected group 72 a predetermined incremental amount between the open position and closed position. Any predetermined incremental amount is hereby contemplated such as is 1%, 2.5%, 5%, 7.5%, 10%, 12.5%, 15%, 17.5%, 20%, 22.5% or 25%, or the like. Or, alternatively, a specified distance is predetermined such as 1 inch, 2 inches, 3 inches, 4 inches, 5 inches 6 inches 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, or the like. Jog up button 116 and a jog down button 118 are presented either above, below or to either side of window illustration 104.

An interactive bottom bar 120 is presented in association with window illustration 104. When the user actuates any one of the control buttons 106, 108, 110, 112, 114, 116, 118 the bottom bar 120 moves to a corresponding position over window illustration 104 simultaneously with the actual movement of the motorized window coverings 36. That is, as an example, if the motorized window coverings 36 associated with the selected group 72 are in a closed position, the bottom bar 120 is shown in a closed position. As another example, if the motorized window coverings 36 associated with the selected group 72 are in at 71% open, the bottom bar 120 is shown at approximately 71% open. When the user actuates one of the control buttons 106, 108, 110, 112, 114, 116, 118 the bottom bar 120 moves in real time with the motorized window coverings 36 associated with the selected group 72. This provides the user with visual feedback that the appropriate selection was made and that the motorized window covering(s) 36 was moved to the appropriate desired position. In the event the wireless device 16 is a touch screen device, the user may interact with the bottom bar 120 by merely swiping the bottom bar 120 and moving it to the desired position. That is, when swiping, the user touches or lightly presses the image of the bottom bar 120. The application 58 recognizes that the bottom bar 120 has been selected and activated. The application 58 recognizes that the bottom bar 120 has been selected by making a slight visual change to bottom bar 120 and/or window illustration 104, or alternately application 58 issues a vibration or sound acknowledgement through the handheld device 16. Once selected, the bottom bar 120 is able to be moved by the user by moving their finger up or down over the window illustration 104 while in constant contact with the surface of window illustration 104. Alternatively, the bottom bar 114 can be moved from its current position by single-tapping, double-tapping, touching with prolonged contact (such as ¼ of a second, a ⅓ of a second, ½ of a second, 1 second or the like), or some other contact with display 19 over window illustration 104. Once application 58 recognizes this command, application moves bottom bar 120 from its current position to the position indicated on window illustration 104.

A similar arrangement is presented for dual roller shades 36B in FIG. 17. That is, to control dual roller shades 36B having blackout shade material 40B and sheer shade material 40S the same window illustration 104 is presented with the same buttons 106, 108, 110, 112, 114, 116, 118 and bottom bar 120, with the addition of blackout shade button 122 and sheer shade button 124. That is, when the user wants the blackout shade 40*b* to open and close, the user selects blackout shade button 122 and when the user wants the sheer shade 40*s* to open and close the user selects the sheer shade button 124. In all other ways, the display of FIG. 17 operates in the manner described with respect to FIG. 5.

A similar arrangement is presented for Venetian shades 36V in FIG. 18. That is, to control Venetian shades 36V having slat-type shade material 40*v* the same window illustration 104 is presented with the same buttons 106, 108, 110, 112, 114, 116, 118 and bottom bar 120, with the addition of slat-type shade material 40*v*. FIG. 18 also includes a tilt button 126 which when actuated tilts the slat-type shade material 40*v* in the direction the tilt-button is moved. As the user moves the tilt button 126, the slat-type shade material 40*v* presented over the window illustration 104 moves in corresponding fashion with the tilt button 126 and with the slats themselves on the motorized window coverings 36. In all other ways, the display of FIG. 18 operates in the manner described with respect to FIGS. 5 and 17.

A similar arrangement is presented for drapery shades 36D in FIG. 19. That is, to control drapery shades 36*d*, either center opening or side opening, having drapery shade material 40*d* which hangs down from a support a similar window illustration 104 is presented with the same buttons 106, 108, 110, 112, 114, 116, 118. However, these buttons may be moved to be horizontally aligned, instead of vertically aligned. Instead of a bottom bar 120, the drapery shade 36D can be activated by the user selecting the drapery shade material 40D and pulling or dragging the drapery shade material 40D to the desired position. As the user moves the tilt button drapery shade material 40D, the drapery shade material 40*d* presented over the window illustration 104 moves in corresponding fashion with the drapery material 40*d* of the motorized window coverings 36. In all other ways, the display of FIG. 19 operates in the manner described with respect to FIGS. 5 and 17 and 18.

Scenes:

While groups 72 allow a user to simultaneously control a plurality of motorized window coverings 36 simultaneously to similar positions, scenes allow the user to set a plurality of motorized window coverings 36 to different positions. That is, when the user selects a scene some motorized window coverings 36 may be all the way open, while others may be all the way closed, while others may be only partially opened or partially closed, and some may have the blackout material 40*b* whereas others are the sheer material 40S, and so on. Scenes allow the user to set each particular motorized window coverings 36 to the perfect position with only a single press of a button.

Figure 20:
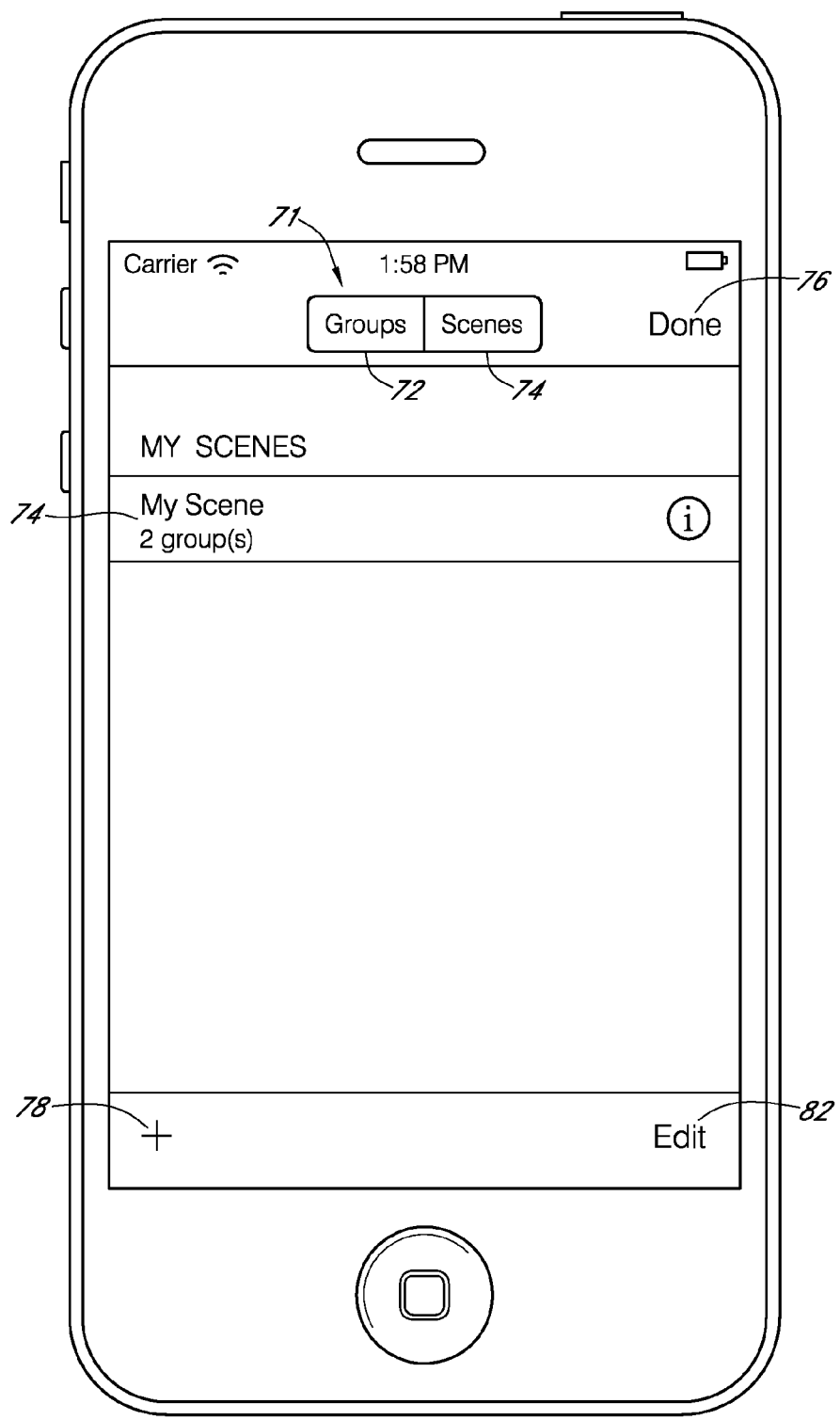
FIG. 20 is a plan view of a screen of an application used with the system, the view showing a scene selection page.
Figure 21:
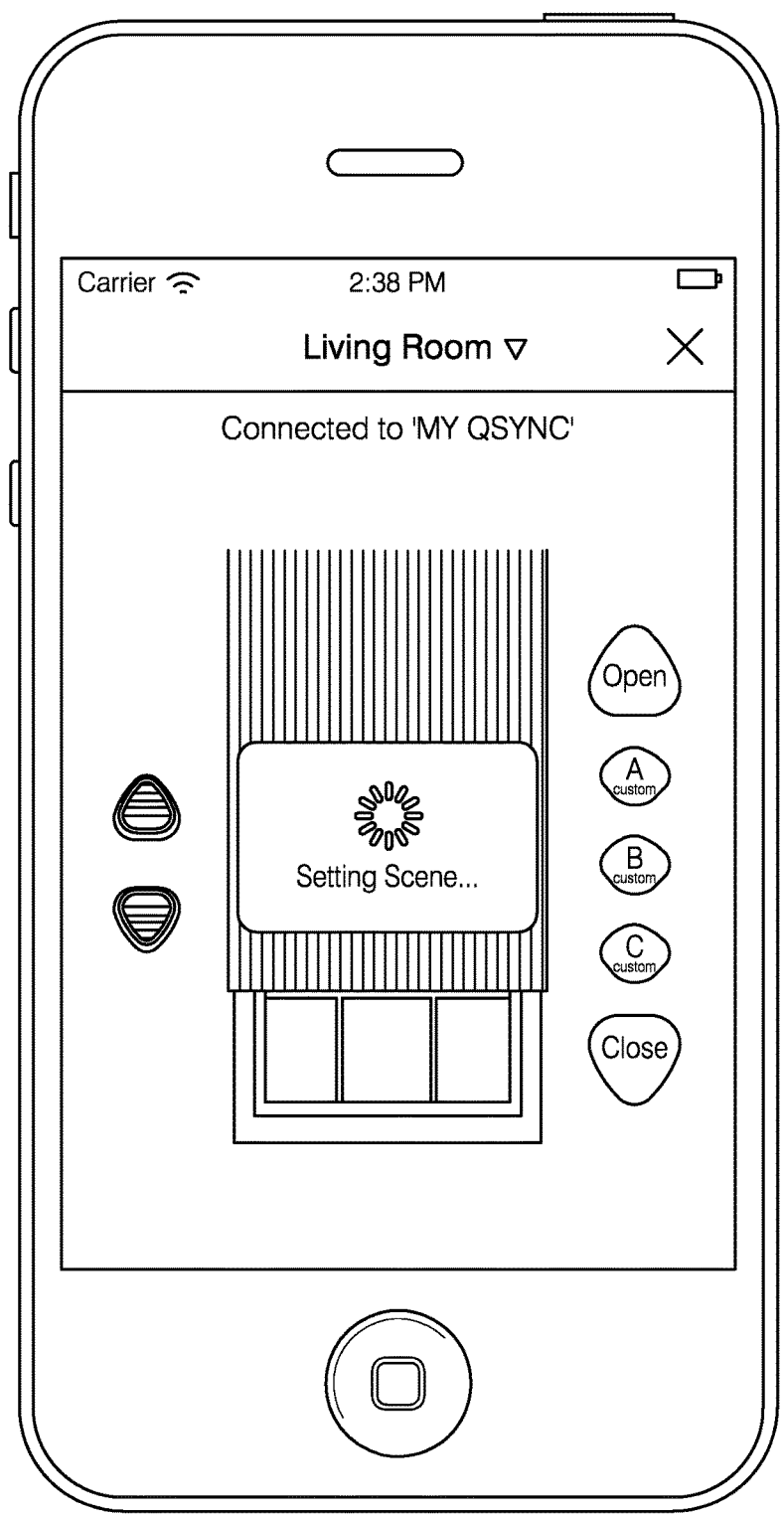
FIG. 21 is a plan view of a screen of an application used with the system, the view showing a scene setting page.

To set a scene, the user selects the scene button 74 on the selection page 70 (FIG. 6). This takes the user to the display of FIG. 20 which displays the plurality of scenes 74 that are programmed in the application 58. The user can select any of the programmed scenes 74 by tapping or scene 74 at which point the user will be shown the display of FIG. 21 as all the motorized window coverings 36 move to their specified positions according to the scene 74.

Figure 22:
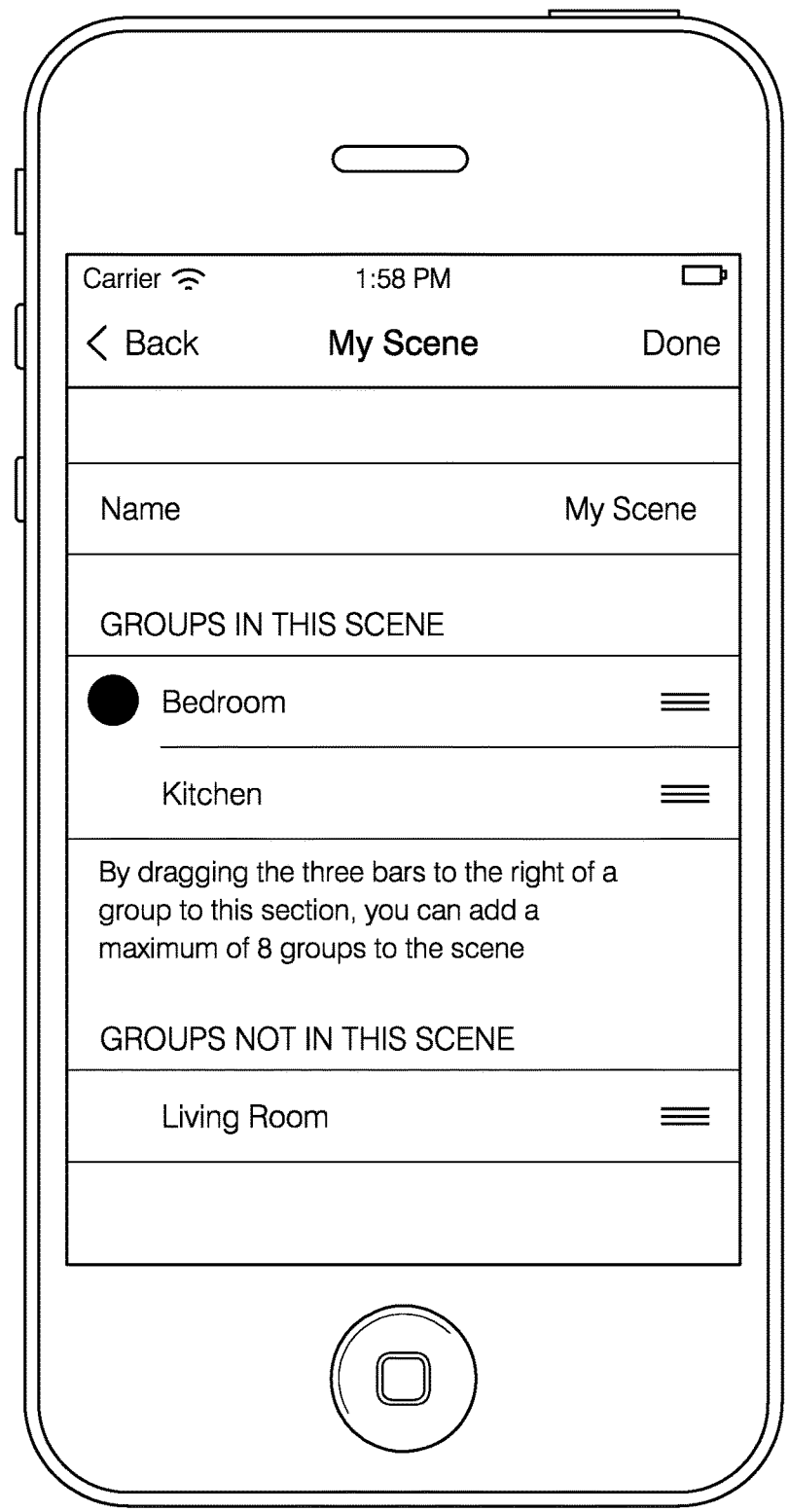
FIG. 22 is a plan view of a screen of an application used with the system, the view showing a scene setup page.

Alternatively, the user can add new scenes by selecting the add button 78, or they can edit a scene 74 by selecting the edit button 82. By selecting the edit button 82 the user is taken to the display of FIG. 22 which allows the user to move groups 72 into or out of the scene 74. The user can also select each of the groups 72 within the scene 74 and set their individual positions, as is described herein.

In Operation—On Home Network:

When the wireless device 16 is on the home network, that is within over-the-air communication distance with wireless access point 12, the system 10 operates in the following manner: Wireless device 16 directly communicates with wireless access point 12 via Wi-Fi or a similar communication method and provides instructions to move various motorized window covering(s) 36. These instructions are passed to gateway 20. These instructions are received and processed by microprocessor 30 of gateway 20 pursuant to the instructions saved in memory 32. Microprocessor 30 transmits digital signals to transceiver 28 and instructs transceiver 28 to transmit electromagnetic signals via antenna 34 over-the-air to the appropriate motorized window coverings 36.

These electromagnetic signals are received by antenna 48 of control module 46 and received and processed by transceiver 50 which converts the electromagnetic signals to a digital signal. This digital signal is transmitted to microprocessor 52 which decodes and processes the digital signal pursuant to the instructions saved in memory 54. If the instructions are meant for that particular motorized window covering 34, microprocessor 52 instructs motor 56 to move to the appropriate position. If the instructions are not meant for the particular motorized window covering 36, the instructions are ignored. In one arrangement command of particular motorized window coverings 36 is accomplished by assigning a specific unique identification number to each motorized window coverings 36.

Control module 46 provides real-time feedback to wireless device 16 in the opposite manner. With this feedback information, application 58 knows to move bottom bar 120 over the window illustration 104 in real time with the motorized window coverings 36.

In Operation—Off Home Network:

When the wireless device 16 is not on the home network that is not within over-the-air communication distance with wireless access point 12, the system 10 operates in the following manner: Wireless device 16 connects to a conventional cell tower, the cell tower then connects to an internet service provider (or ISP). The ISP then connects the wireless device 16 to the user's router 14 through the user of an IP address being assigned to the router 14. The router then connects to the gateway 20. Through this connection, the wireless device 16 communicates with gateway 20 through the electronic network or internet 15. In this way, wireless device 16 transmits instructions to move various motorized window covering(s) 36. These instructions are passed to gateway 20. These instructions are received and processed by microprocessor 30 of gateway 20 pursuant to the instructions saved in memory 32. Microprocessor 30 transmits digital signals to transceiver 28 and instructs transceiver 28 to transmit electromagnetic signals via antenna 34 over-the-air to the appropriate motorized window coverings 36.

These electromagnetic signals are received by antenna 48 of control module 46 and received and processed by transceiver 50 which converts the electromagnetic signals to a digital signal. This digital signal is transmitted to microprocessor 52 which decodes and processes the digital signal pursuant to the instructions saved in memory 54. If the instructions are meant for that particular motorized window covering 34, microprocessor 52 instructs motor 56 to move to the appropriate position. If the instructions are not meant for the particular motorized window covering 36, the instructions are ignored. In one arrangement command of particular motorized window coverings 36 is accomplished by assigning a specific unique identification number to each motorized window coverings 36.

Control module 46 provides real-time feedback to wireless device 16 in the opposite manner. With this feedback information, application 58 knows to move bottom bar 120 over the window illustration 104 in real time with the motorized window coverings 36.

Modifications:

While the application 58 is shown with a window covering that moves vertically, it is herein contemplated that the application can be used for drapery that moves from side to side. In addition, while only a single gateway 20 is described as part of the system 10, it is hereby contemplated that a plurality of gateways 20 can be used in a single system 10 having a network 60/62. This is particularly important for larger buildings such as an industrial building wherein a single gateway 20 cannot reach all motorized window coverings 36 in the building. In this arrangement, when a signal is sent from wireless device 16, it is transmitted through the network 60/62 to the appropriate gateway 20 thereby actuating far-away motorized window coverings 36.

From the above discussion it will be appreciated that system and method for wireless communication with and control of motorized window coverings presented improves upon the state of the art.

That is, the system and method for wireless communication with and control of motorized window coverings presented is easy to use, intuitive, simple and provides a plurality of novel ways to actuate the motorized window coverings. In addition, the system and method for wireless communication with and control of motorized window coverings presented is inexpensive, allows for the actuation of a plurality of window coverings simultaneously, allows for grouping of a plurality of motorized window coverings and provides visual feedback to the user as to the location of the motorized window coverings. As such, all of the stated objectives have been accomplished.

It will be appreciated by those skilled in the art that other various modifications could be made to the device without parting from the spirit and scope of this invention. All such modifications and changes fall within the scope of the claims and are intended to be covered thereby.

What is claimed:

1. A system for controlling at least one motorized window covering, comprising:
   a wireless device having a display;
   an application installed on the wireless device;
   an illustration of a window presented on the display;
   at least one button presented on the display;
   at least one motorized window covering wirelessly connected to the wireless device;
   wherein when the at least one button is activated the at least one motorized window covering is activated to move to a corresponding position;
   wherein the at least one button includes an open button that is configured to move the at least one motorized window covering to an open position;

wherein the at least one button includes a close button that is configured to move the at least one motorized window covering to a closed position;

wherein the at least one button includes at least one position button that is configured to move the at least one motorized window covering to a preset position between an open position and a closed position;

wherein the at least one button includes at least one jog button that is configured to move the at least one motorized window covering an incremental amount;

an interactive bottom bar presented on the display;

wherein when the bottom bar is moved to a position, the wireless device transmits a wireless control signal thereby moving the at least one motorized window covering to a corresponding position.

2. The system of claim 1 further comprising a wireless access point which is connected to the at least one motorized window covering; wherein the wireless device directly connects to the wireless access point using a first wireless signal when the wireless device is within over-the-air communication distance with the wireless access point.

3. The system of claim 1 further comprising a wireless access point which is connected to the at least one motorized window covering; wherein the wireless device directly connects to the wireless access point through a cellular tower and the internet when the wireless device is outside of over-the-air communication distance with the wireless access point.

4. The system of claim 1 further comprising a wireless access point wherein the wireless access point is connected to a gateway having an antenna which communicates with the at least one motorized window covering using a second wireless signal to control the at least one motorized window covering.

5. The system of claim 1 wherein a plurality of individual window coverings are organized in a first group and controlled simultaneously to the same approximate position as one another by actuating a single control on the wireless device.

6. The system of claim 1 wherein the at least one position button includes a first position button, a second position button, and a third position button is presented, wherein when the first position button is actuated the at least one motorized window covering is actuated to approximately 25% closed, wherein when the second position button is actuated the at least one motorized window covering is actuated to approximately 50% closed, wherein when the third position button is actuated the at least one motorized window covering is actuated to approximately 75% closed.

7. The system of claim 1, wherein the display has jog button, wherein when the jog button is actuated the at least one motorized window covering is actuated to move a predetermined amount or distance.

8. The system of claim 1, wherein the at least one motorized window covering is selected from the group consisting of roller shades, dual roller shades, honeycomb shades, pleated shades, Venetian shades, drapery shades and zebra shades.

9. The system of claim 1 wherein a plurality of individual window coverings are organized in a scene and controlled simultaneously to their own predetermined position, which is not necessarily the same approximate position as one another, by actuating a single control on the wireless device.

10. The system of claim 9, wherein when the at least one motorized window covering is selected from the group consisting of roller shades, dual roller shades, honeycomb shades, pleated shades, Venetian shades, drapery shades and zebra shades.

11. The system of claim 9, wherein when the wireless device is within over-the-air communication distance with a wireless access point, the wireless device communicates directly with the wireless access point using a first wireless signal, the wireless access point then transmits a signal to a gateway which wirelessly transmits a control signal to the at least one motorized window covering using a second wireless signal.

12. The system of claim 9, wherein when the wireless device is outside of over-the-air communication distance with a wireless access point, the wireless device communicates with the wireless access point by connecting to a cell tower which connects to the internet which connects to a gateway within over-the-air communication distance to the at least one motorized window covering and wirelessly transmits a control signal to the at least one motorized window covering using a second wireless signal.

13. A system for controlling at least one motorized window covering, comprising:
a wireless device having a display;
an application installed on the wireless device;
an image of a window presented on the display;
an interactive bottom bar presented on the image of a window presented on the display;
at least one motorized window covering wirelessly connected to the wireless device and controlled by the wireless device;
wherein when the at least one bottom bar is moved on the image of a window presented on the display the at least one motorized window covering is moved to a corresponding position;
an open button that is configured to move the at least one motorized window covering to an open position;
a close button that is configured to move the at least one motorized window covering to a closed position;
at least one position button that is configured to move the at least one motorized window covering to a preset position between an open position and a closed position;
at least one log button that is configured to move the at least one motorized window covering an incremental amount.

* * * * *

UNITED STATES PATENT AND TRADEMARK OFFICE
CERTIFICATE OF CORRECTION

PATENT NO. : 9,609,114 B2  
APPLICATION NO. : 14/781198  
DATED : March 28, 2017  
INVENTOR(S) : Willis J. Mullet and Matthew W. Kirkland It is certified that error appears in the above-identified patent and that said Letters Patent is hereby corrected as shown below:

In the Claims

In Column 15, Lines 41-50, Claim 6 should be amended as provided below:
6. The system of claim 1 wherein the at least one position button includes a first position button, a second position button, and a third position button, wherein when the first position button is actuated the at least one motorized window covering is actuated to approximately 25% closed, wherein when the second position button is actuated the at least one motorized window covering is actuated to approximately 50% closed,
wherein when the third position button is actuated the at least one motorized window covering is actuated to approximately 75% closed.

In Column 15, Lines 51-54, Claim 7 should be amended as provided below:
7. The system of claim 1, wherein the display has a jog button, wherein when the jog button is actuated the at least one motorized window covering is actuated to move a predetermined amount or distance.

In Column 16, Lines 30-54, Claim 13 should be amended as provided below:
13. A system for controlling at least one motorized window covering, comprising:
a wireless device having a display;
an application installed on the wireless device;
an image of a window presented on the display;
an interactive bottom bar presented on the image of a window presented on the display;
at least one motorized window covering wirelessly connected to the wireless device and controlled by the wireless device;
wherein when the at least one bottom bar is moved on the image of a window presented on the display the at least one motorized window covering is moved to a corresponding position;
an open button that is configured to move the at least one motorized window covering to an open position;

Signed and Sealed this
Thirteenth Day of June, 2017

Joseph Matal
*Performing the Functions and Duties of the
Under Secretary of Commerce for Intellectual Property and
Director of the United States Patent and Trademark Office* a close button that is configured to move the at least one motorized window covering to a closed position;

at least one position button that is configured to move the at least one motorized window covering to a preset position between an open position and a closed position;

at least one jog button that is configured to move the at least one motorized window covering an incremental amount.